United States Patent
Chakraborty et al.

(12)

(10) Patent No.: US 11,025,715 B2
(45) Date of Patent: *Jun. 1, 2021

(54) CLOUD-TO-CLOUD PEERING

(71) Applicant: AT&T INTELLECTUAL PROPERTY I, L.P., Atlanta, GA (US)

(72) Inventors: Soumyajit Chakraborty, Harrison, NJ (US); James Gordon Beattie, Jr., Bergenfield, NJ (US); Nicholas Bruno, Bayville, NJ (US); Stephen J. Griesmer, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 330 days.

This patent is subject to a terminal disclaimer.

(21) Appl. No.: 15/221,327

(22) Filed: Jul. 27, 2016

(65) Prior Publication Data

US 2016/0337447 A1 Nov. 17, 2016

Related U.S. Application Data

(63) Continuation of application No. 13/219,780, filed on Aug. 29, 2011, now Pat. No. 9,432,454.

(51) Int. Cl.
*G06F 16/182* (2019.01)
*H04L 29/08* (2006.01)
*H04L 29/06* (2006.01)

(52) U.S. Cl.
CPC ...... *H04L 67/1091* (2013.01); *G06F 16/1834* (2019.01); *H04L 67/104* (2013.01); *H04L 67/42* (2013.01)

(58) Field of Classification Search
CPC ... H04L 67/1091; H04L 67/104; H04L 67/42; G06F 17/30206; G06F 16/1834
See application file for complete search history.

(56) References Cited

U.S. PATENT DOCUMENTS

| | | | |
|---|---|---|---|
| 5,987,506 A | 11/1999 | Carter et al. | |
| 6,289,382 B1 * | 9/2001 | Bowman-Amuah | G06F 13/387 709/226 |
| 6,483,312 B2 * | 11/2002 | Shimizu | F02D 41/009 324/391 |
| 7,797,375 B2 | 9/2010 | Vincent | |

(Continued)

OTHER PUBLICATIONS

"Cloud Computing", "Cloud Computing," Wikipedia, Retrieved on May 13, 2011, Retrieved from http://en.wikipedia.org/wiki/Cloud_computing, 22 pages.

(Continued)

*Primary Examiner* — Robert W Beausoliel, Jr.
*Assistant Examiner* — Susan F Rayyan
(74) *Attorney, Agent, or Firm* — Guntin & Gust, PLC; Douglas Schnabel

(57) ABSTRACT

A method includes transmitting first data to a first cloud from a first device. The first data first data instructs the first cloud that a first item stored in the first cloud be made accessible to a second device via a second cloud that is coupled to the first cloud. The method further includes receiving second data from the first cloud at the first device. The second data is associated with a digital rights management restriction corresponding to a third item of the first cloud or the second cloud.

20 Claims, 13 Drawing Sheets

(56) References Cited

U.S. PATENT DOCUMENTS

| | | | | |
|---|---|---|---|---|
| 8,020,144 | B2* | 9/2011 | Yang | G06F 8/20 717/106 |
| 8,364,758 | B2* | 1/2013 | Hydrie | H04L 67/1002 709/204 |
| 8,447,801 | B1* | 5/2013 | Roche | H04L 67/306 709/201 |
| 8,473,429 | B2* | 6/2013 | Cheng | G06F 17/30032 706/12 |
| 8,595,360 | B2* | 11/2013 | Hill | G06F 21/10 709/226 |
| 8,799,363 | B2* | 8/2014 | Anbalagan | G06Q 30/0241 709/204 |
| 9,047,310 | B2* | 6/2015 | Li | G06F 17/30206 |
| 9,066,123 | B2* | 6/2015 | Christopher | H04N 21/2543 |
| 2004/0003090 | A1 | 1/2004 | Deeds | |
| 2004/0064693 | A1 | 4/2004 | Pabla et al. | |
| 2004/0148611 | A1 | 7/2004 | Manion et al. | |
| 2006/0020974 | A1 | 1/2006 | Birnbaum et al. | |
| 2007/0011717 | A1 | 1/2007 | Lauder et al. | |
| 2007/0214259 | A1* | 9/2007 | Ahmed | G06Q 30/02 709/224 |
| 2009/0019050 | A1 | 1/2009 | Baron et al. | |
| 2009/0113472 | A1 | 4/2009 | Sheth et al. | |
| 2009/0144782 | A1 | 6/2009 | Yu et al. | |
| 2009/0144789 | A1 | 6/2009 | Yu et al. | |
| 2009/0177734 | A1 | 7/2009 | Arthursson | |
| 2009/0198825 | A1* | 8/2009 | Miller | H04L 67/104 709/230 |
| 2009/0222874 | A1 | 9/2009 | White et al. | |
| 2009/0319370 | A1* | 12/2009 | Jain | G06F 17/30029 705/14.54 |
| 2010/0010944 | A1 | 1/2010 | Cheng et al. | |
| 2010/0248698 | A1 | 9/2010 | In et al. | |
| 2010/0333116 | A1* | 12/2010 | Prahlad | G06F 3/0649 719/328 |
| 2011/0055161 | A1 | 3/2011 | Wolfe | |
| 2011/0137991 | A1* | 6/2011 | Russell | G06Q 10/06 709/204 |
| 2011/0153727 | A1* | 6/2011 | Li | G06F 9/5055 709/203 |
| 2011/0225417 | A1* | 9/2011 | Maharajh | G06F 21/10 713/150 |
| 2011/0276656 | A1 | 11/2011 | Knapp et al. | |
| 2011/0288946 | A1 | 11/2011 | Baiya et al. | |
| 2011/0314153 | A1* | 12/2011 | Bathiche | H04L 63/08 709/225 |
| 2012/0005274 | A1 | 1/2012 | Lee et al. | |
| 2012/0023594 | A1* | 1/2012 | Hwang | H04N 21/83555 726/28 |
| 2012/0036048 | A1* | 2/2012 | Robb | G06F 3/04817 705/27.2 |
| 2012/0042040 | A1* | 2/2012 | Bailey | G06F 9/5055 709/217 |
| 2012/0059932 | A1 | 3/2012 | Messer et al. | |
| 2012/0124172 | A1* | 5/2012 | Sparks | G06Q 20/123 709/219 |
| 2012/0179822 | A1 | 7/2012 | Grigsby et al. | |
| 2012/0216133 | A1* | 8/2012 | Barker | G06F 21/629 715/760 |
| 2012/0221636 | A1 | 8/2012 | Surtani et al. | |
| 2012/0250782 | A1 | 8/2012 | Chen et al. | |
| 2012/0233236 | A1 | 9/2012 | Chen et al. | |
| 2012/0254962 | A1 | 10/2012 | Chen | |
| 2012/0290308 | A1 | 11/2012 | Detwiller et al. | |
| 2012/0311657 | A1* | 12/2012 | Boldyrev | H04L 63/20 726/1 |
| 2013/0024901 | A1 | 1/2013 | Sharif-Ahmadi et al. | |
| 2013/0117337 | A1 | 5/2013 | Dunham | |
| 2013/0121487 | A1* | 5/2013 | Lorberbaum | H04L 9/0861 380/44 |
| 2013/0138649 | A1* | 5/2013 | Broberg | H04L 67/1025 707/736 |
| 2014/0149794 | A1 | 5/2014 | Shetty et al. | |

OTHER PUBLICATIONS

Wu, et al., "Cloud to Cloud: A Framework Model for Next Generation Network Management", Wu, D. et al., "Cloud to Cloud: A Framework Model for Next Generation Network Management," 10th International Conference on Telecommunications, IEEE Conference Publications, vol. 1, 2003, pp. 240-245.

* cited by examiner

1000

1002
Present a graphical user interface at a display of a first device associated with a first user

1004
Present a search menu in response to a selection of a search button

1006
Receive a search term at the search menu from the first device via a network

1008
Communicate a query to a server associated with the first cloud, where the query includes the search term

1010
Receive a response to the query from the server that includes information relevant to the search term

FIG. 10

CLOUD-TO-CLOUD PEERING

CLAIM OF PRIORITY

The present application claims priority from, and is a continuation of U.S. patent application Ser. No. 13/219,780, filed Aug. 29, 2011, the content of which is incorporated by reference herein in its entirety.

FIELD OF THE DISCLOSURE

The present disclosure is generally related to cloud services.

BACKGROUND

Users are increasingly saving files in online storage locations instead of, or in addition to, saving such files on personal computers or other computing devices. Typically, the files that are stored in an online storage location are accessible to only the user that saved the files. Moreover, some online storage systems may restrict access to a stored file to only the specific user device that was used to upload the file and/or the specific network via which the file was uploaded.

BRIEF DESCRIPTION OF THE DRAWINGS

FIG. 10 is a flow chart of another particular embodiment of a cloud-to-cloud peering method;

DETAILED DESCRIPTION

Figure 1:
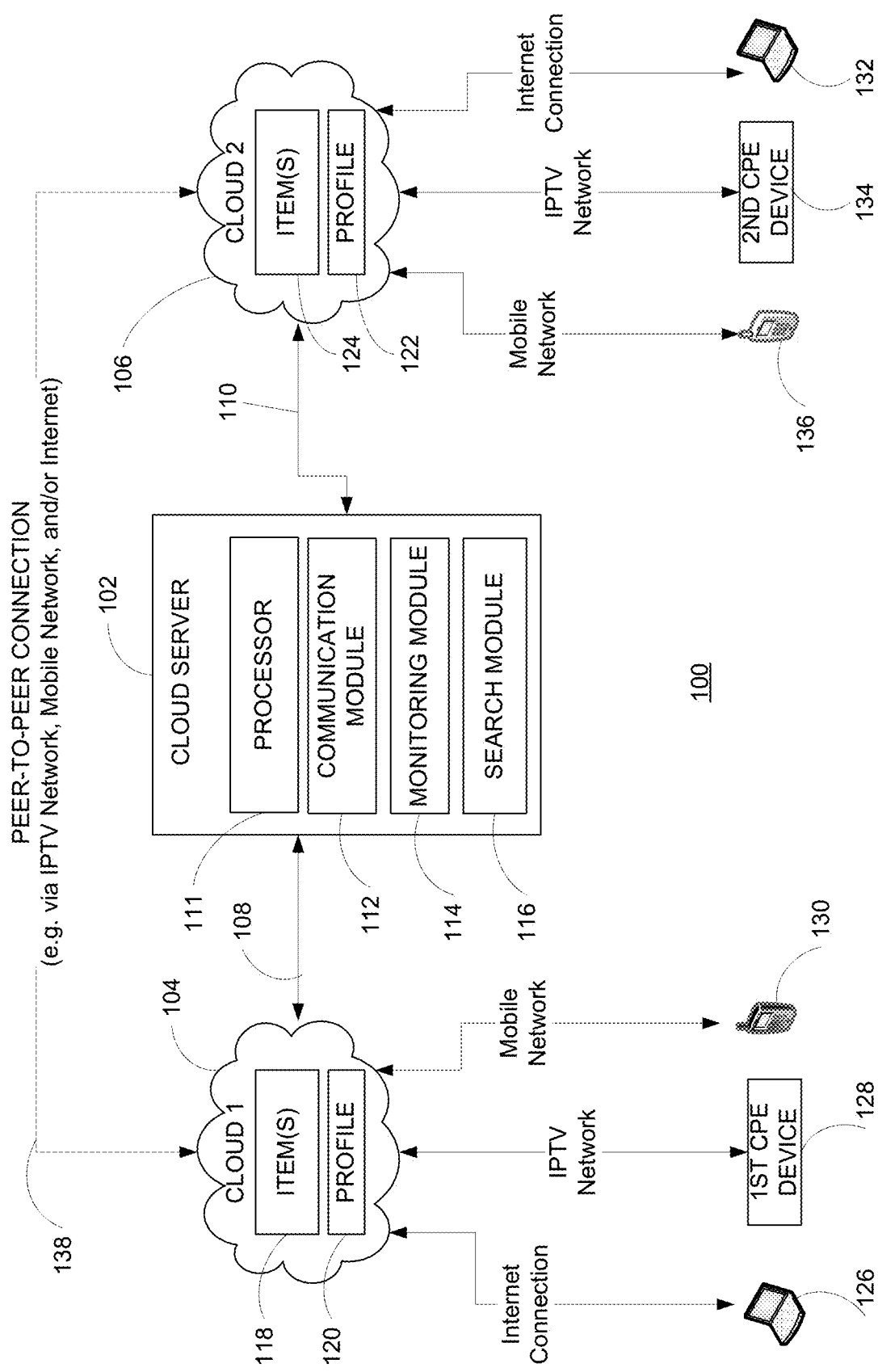
FIG. 1 is a block diagram of an illustrative embodiment of a cloud-to-cloud peering system.

Systems and methods to implement a storage and sharing system including cloud-to-cloud peering are disclosed. The disclosed systems and methods may enable users to share files as well as applications with other users. To illustrate, each user may be associated with a cloud (e.g., computing and data resources representing a plurality of items stored by the first user at a remote location from a user device). Items in the cloud may be accessible to the first user at multiple devices via multiple networks (e.g., at a mobile phone via a mobile communications network, at a set-top box via an Internet Protocol television (IPTV) network, and at a computer via the Internet).

The first user may be associated with a first user profile that indicates which items within the user's cloud are shared with other users (e.g., accessible to various devices associated with the other users). The first user may also search clouds associated with other users for items (e.g., files, games, or applications) of interest. The disclosed techniques may also enable automatic notifications to users when peers of the user add new items to a cloud, share additional items or update an item in the cloud, or perform other actions at their own cloud. One or more cloud service providers may implement a social network for each user, where the social network for a particular user references the clouds of the particular user's peers.

In a particular embodiment, a method includes receiving an input at a first cloud from a first device associated with a first user. The input indicates that an item stored in the first cloud is accessible to a second device associated with a second user via a second cloud that is coupled to the first cloud. The first cloud is associated with the first user and the second cloud is associated with the second user.

In another particular embodiment, a server includes a processor and a search module executable by the processor to receive a search request from a first cloud of a plurality of clouds. The first cloud is associated with a first user and the first cloud includes a plurality of items stored in the first cloud that are accessible to a plurality of devices of the first user via a first network. The search module is also executable by the search module to identify information relevant to the search request that is accessible via a second cloud of the plurality of clouds. The search module is further executable by the processor to communicate the information relevant to the search request to the first cloud.

In another particular embodiment, a computer-readable storage medium includes instructions that, when executed by a processor, cause the processor to provide access to a first cloud via a graphical user interface displayed at a first device of a first user. The first cloud includes a plurality of items stored in memory within the first cloud and that are accessible remotely to a plurality of devices of the first user. The graphical user interface (GUI) includes a status window configured to display information associated with one or more activities of a second cloud associated with a second user. The second cloud includes a second plurality of items stored in memory within the second cloud. The GUI also includes a search button operable to present a search menu at the GUI. Additionally, the GUI includes a profile button operable to present a plurality of attributes of a profile of the first user and one or more additional buttons associated with the plurality of items stored in the first cloud. A files button is operable to present a files menu that provides access to an image library, a video library, applications, games, output devices, a shared storage partition of the first cloud, or any combination thereof. A peer menu button is operable to present a peer menu that provides access to a peer list, a group of peers list, available peer items, notifications, a shared storage partition of one or more peer clouds, or any combination thereof.

Referring to FIG. 1, a particular illustrative embodiment of a cloud-to-cloud peering system 100 is shown. The cloud-to-cloud peering system 100 includes a first cloud 104, a second cloud 106, and a cloud server 102 (e.g., as part of a cloud computing server complex). The cloud server 102 is coupled to the first cloud 104 and to the second cloud 106. For example, the cloud server 102 may be coupled to the first cloud 104 via a first communication link 108. Similarly, the cloud server 102 may be coupled to the second cloud 106 via a second communication link 110. The communication links 108, 110 may be implemented using wired and/or wireless connections via one or more networks. In addition, the first cloud 104 may be coupled via a peer-to-peer relationship connection 138 to the second cloud 106. In a particular illustrative embodiment, the peer-to-peer relationship connection 138 is established via the cloud server 102.

Clouds (e.g., the first cloud 104 and the second cloud 106) include computational resources (e.g., data, hardware, and software) and are accessible by user devices via a computer network. Each cloud may provide secure remote access to applications and data from any user device that has access to the computer network. For example, secure access may involve authentication of users and peers. Clouds may enable cloud computing that provides computation, software, data access, and storage services for users without requiring end user knowledge of physical location and system configuration details.

The first cloud 104 includes a plurality of items 118 and a profile 120. The profile 120 may correspond to a particular user having access to the first cloud 104. The first cloud 104 may provide access to the plurality of items 118 to a plurality of user devices. For example, the first cloud 104 may provide access to the plurality of items 108 to a first device 126, to a second device 128, and to a third device 130, where each of the devices 126-130 are owned by or otherwise associated with a first user. In a particular illustrative embodiment, the first device is a laptop computer or other similar computing device connected to the first cloud 104 via an internet connection. The second device 128 may be a customer premise equipment (CPE) device, such as a set-top box, residential gateway, or other CPE device coupled to the first cloud 104 via an Internet Protocol television network (IPTV). The third device 130 may be a wireless device, such as a smartphone, a cell phone, a personal digital assistant, a tablet computing device, or other portable device having access to the first cloud 104 via a wireless communication network (e.g., mobile network).

The second cloud 106 provides access to a second plurality of items 124 to various user devices (e.g., devices owned by or otherwise associated with a second user). For example, the second cloud 106 may provide access to a first device 132, a second device 134, and a third device 136. As shown in FIG. 1, the first device 132 may be a computing device having access to an internet connection, the second device 134 may be a CPE device having access to an IPTV network, and the third device 136 may be a communication device having access to the second cloud 106 via a wireless communication network. In addition, the second cloud 106 may include a second profile 122 of the second user.

In a particular embodiment, items stored in a cloud (e.g., the plurality of items 118, 124) may include various multimedia files, gaming applications (e.g., single or multiplayer games), computing applications, video content, image content, audio content, or any other file or data that may be accessible via a cloud and/or a peer-to-peer connection between clouds. The plurality of items 118 and 124 may also represent physical devices or other resources (e.g., hardware resources) accessible via a cloud and/or a peer-to-peer connection between clouds. For example, the plurality of items 118 and 124 may include an output device, a shared storage partition of a storage device, a database, or other products, devices, or services accessible via a cloud and/or a peer-to-peer connection between clouds.

The cloud server 102 includes a processor 111. The processor 111 may be a computer processor that is operable to execute a plurality of software modules. For example, the processor 111 may execute one or more of a communication module 112, a monitoring module 114, and a search module 116. While each of the modules 112-116 are shown as separate modules, it should be understood that one or more software programs may be executed by the processor 111 to perform each module separately or collectively, depending on particular application and system requirements, configurations, and implementations.

The processor 111 may execute the search module 116 to perform various functions. For example, the search module 116 may be executable by the processor 111 to receive a search request from a first cloud of a plurality of clouds (e.g., from the first cloud 104). The search module 116 may also be executable by the processor 111 to identify information relevant to the search request that is accessible via a second cloud of the plurality of clouds (e.g., via the second cloud 106). Further, the search module 116 may communicate the information relevant to the search request to the first cloud (e.g., the first cloud 104). Thus, in response to a search query from the first user via the first cloud 104, the search module 116 may identify particular items of the plurality of items 124 within the second cloud 106 that are relevant to the search request and may provide information about the particular items to the first user. The particular items at the second cloud 106 may be accessible to the first user via the peer-to-peer connection 138 (e.g., after the first user requests establishment of the peer-to-peer connection 138 and the second user accepts the request).

In a particular embodiment, the first user may stream a multimedia file stored at the second cloud 106 to the first cloud 104 via the peer-to-peer connection 138. Alternately, or in addition, the first user may download or copy the multimedia file (or another file or application) from the second cloud 106 to the first cloud 104.

The monitoring module 114 is executable by the processor 111 to monitor one or more activities of the plurality of clouds (e.g. activities of the first cloud 104 and/or the second cloud 106). The one or more monitored activities may correspond to an application at a particular cloud being executed, a game at the particular cloud being played, a multimedia file at the particular cloud being viewed, a file at the particular cloud being viewed, or any combination thereof. Thus, the monitoring module 114, as executed by the processor 111, may monitor one or more activities of the clouds and such activities may correspond to a variety of actions performed at each of the clouds.

The communication module 112 is executable by the processor 111 to facilitate communications between the server 102 and various clouds (e.g., the clouds 104, 106) via various communication links (e.g., the communication links 108, 110). For example, the communication module 112 may receive search requests from one or more clouds and/or user devices coupled thereto and may transmit information regarding relevant search results to clouds and/or user devices coupled thereto. It should be noted that although the modules 112-116 are illustrated separately, the modules 112-116 may communicate with each other (e.g., via intra-system messages, shared memory, etc.) or may be integrated.

During operation of the cloud-to-cloud peering system 100, the first cloud 104 may receive an input from a first device 126, 128, or 130 associated with the first user. The input may indicate that an item (e.g., one of the items 118) stored in the first cloud 104 is accessible to a second device 132, 134, or 136 associated with the second user via the second cloud 106. The second cloud 106 may be coupled to the first cloud 104 via the peer-to-peer connection 138.

It should be understood that while each of the clouds 104 and 106 may support similar devices, in other embodiments, one of the clouds 104, 106 may support different devices than the other cloud 104, 106 depending on the particular arrangement and service offering of the various cloud components, networks, or providers. In addition, while a plurality of distinct devices have access to each of the clouds 104 and 106, as shown, it should be understood that a user may use a single device or only a subset of available devices to access computing resources, data, or other available items from the user's assigned cloud or from another cloud.

In addition, during operation of the cloud-to-cloud peering system 100, the first user may search for items of interest as described with reference to the search module 116 of the cloud server 102. Items identified as relevant to the first user's search request may include files or applications that are streamed or downloaded from the second cloud 106 to the first cloud 104, or executed at the second cloud 106 from the first cloud 104, via the peer-to-peer connection 138. The peer-to-peer connection 138 may be implemented via a computer network interconnecting the clouds 104, 106 and the server 102.

With the cloud-to-cloud peering system 100, a user, via one or more devices, may access not only items that are associated with the user and are stored in the user's particular cloud, but may also search for and access (e.g. via streaming, downloading, or other access) items owned by other users and stored in other user clouds. Moreover, such access may be performed by multiple devices via multiple networks, as shown.

Figure 2:
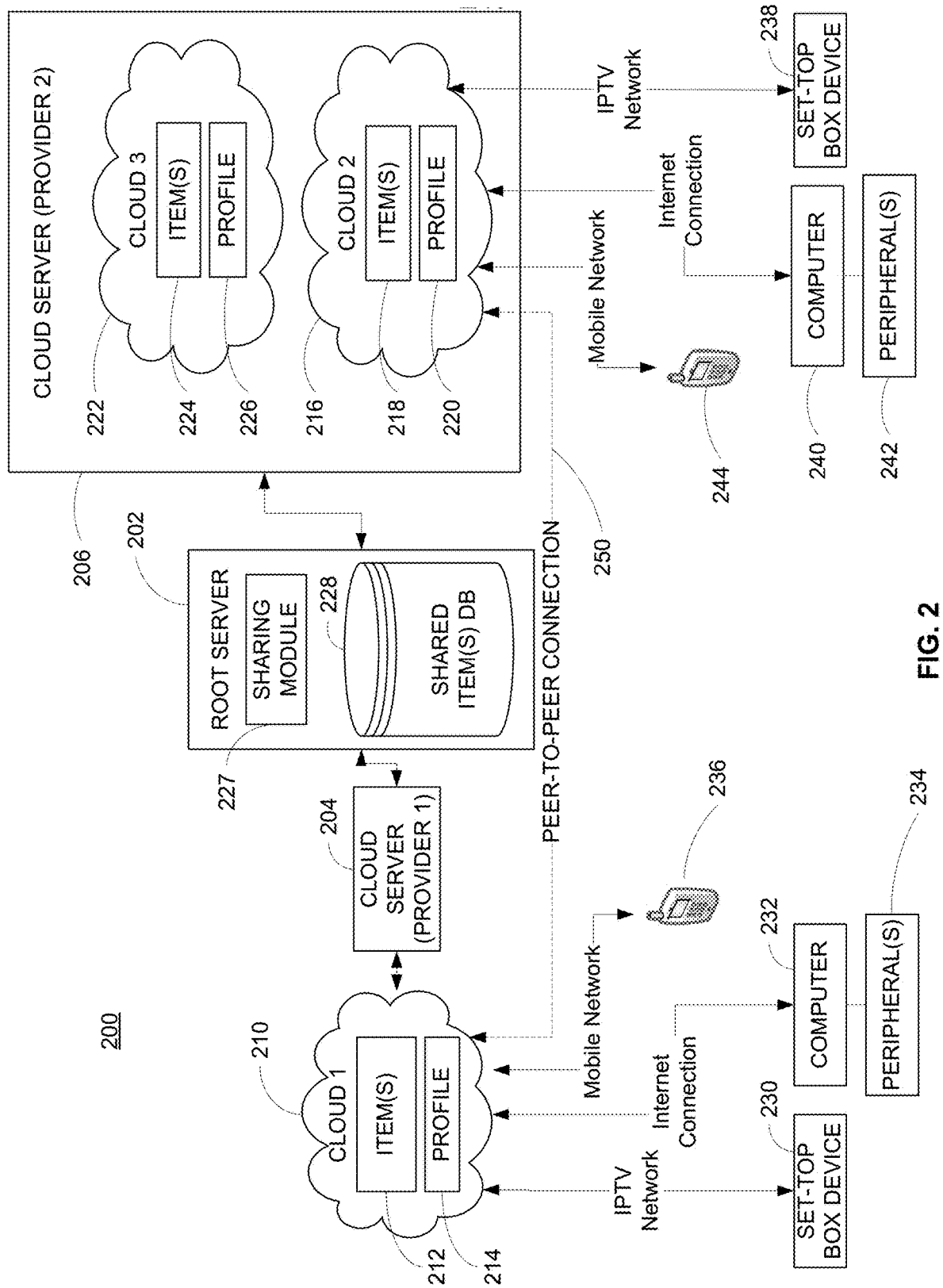
FIG. 2 is a diagram of another illustrative embodiment of a cloud-to-cloud peering system.

Referring to FIG. 2, another illustrative embodiment of a cloud-to-cloud peering system 200 is shown. The cloud-to-cloud peering system 200 includes a first cloud 210, a first cloud server 204 (e.g., a cloud server associated with a first service provider), a root server 202, and a second cloud server 206 (e.g., a cloud server associated with a second service provider). The first cloud 210 includes a plurality of items 212 and a user profile 214. The first cloud 210 is accessible by a plurality of user devices, such as a set-top box device 230, a computer 232 with peripherals 234, and a mobile communication device 236.

The second cloud server 206 supports a second cloud 216 and a third cloud 222. While two clouds are shown as supported by the cloud server 206, it should be understood that the cloud server 206 may support any number of clouds. The second cloud 216 includes a second plurality of items 218 and a second user profile 220. The third cloud 222 includes a third plurality of items 224 and a third user profile 226. As illustrated, the second cloud 216 is connected to the first cloud 210 via a peer-to-peer connection 250. The peer-to-peer connection 250 may be used to transport or otherwise transmit data between the first cloud 210 and the second cloud 216.

In a particular embodiment, the peer-to-peer connection 250 may be implemented as a dedicated data communication session or other communication link using an associated protocol. The second cloud 216 is accessible by a plurality of devices of a second user, such as a mobile device 244, a computer 240 coupled to peripheral(s) 242, and a set-top box device 238. It should be understood that the plurality of devices 238-244 may have access to the second cloud 216 via a variety of distinct networks. For example, the set-top box device 238 may access the second cloud 216 via an IPTV network, the computer 240 may access the second cloud 216 via the Internet, and the mobile device 244 may access the second cloud 216 via a wireless network.

The third cloud 222 may provide access to the plurality of items 224 to a variety of devices (not shown), such as a mobile device, a set-top box, a computer, a gaming device, or any combination thereof. The second cloud server 206 may support multiple clouds that each includes data and computing resources available to a plurality of devices via a plurality of distinct networks.

The root server 202 is coupled to the first cloud server 204 associated with the first service provider and to the second cloud server 206 associated with the second service provider. In a particular embodiment, the first and second service providers offer video, voice, data and/or cloud-based services to users (e.g., in a quad-play service bundle).

The root server 202 may include a shared item database 228 and may facilitate communication between multiple service providers. For example, the root server 202 may facilitate communication between the first cloud server 204 associated with the first service provider and the second cloud server 206 associated with the second service provider.

In a particular illustrative embodiment, the shared item database 228 includes a plurality of entries corresponding to a plurality of items accessible to a plurality of devices via the plurality of clouds. For example, the shared item database 228 may include or otherwise store a plurality of content items that are retrievable from or accessible via the first cloud 210 and the second cloud 216. To illustrate, one or more of the items 212 from the first cloud 210 may be temporarily stored in the shared item database 228 prior to being transported to the second cloud 216.

Alternately, the shared item database 128 may include a plurality of entries and each entry may store an identifier, a location, and other information about a particular item, such as one of the items 212 within the first cloud 210. Similarly, the shared item database 228 may include entries identifying items within other clouds. The shared item database 228 may thus represent a record of items in various clouds that have been designated for sharing between the various clouds (e.g., via a peer-to-peer connection such as the illustrated peer-to-peer connection 250). Designating items for sharing between clouds on a per-user and a per-group basis is further described with reference to FIG. 4.

The root server 202 may also include a sharing module 227 that is executable by a processor or other computing logic within the root server 202. In a particular embodiment, the sharing module 227 is executable by a processor to receive a query from a search module stored within the cloud server 206 (e.g., as described with reference to the search module 116 of FIG. 1). The query may include a search request received from a particular cloud supported by the cloud server 206. For example, a search request may be received from the second cloud 216, where the search request is initiated by one of the devices 238-244. The sharing module 227 may determine that one or more entries in the shared item database 228 represent items that are relevant to the search query. The sharing module 227 may provide or indicate the one or more entries to the search module within the requesting cloud server 206.

While the first cloud 210 is depicted as having the peer-to-peer connection 250 to the second cloud 216, it should be understood that the first cloud 210 may alternatively or in addition have a peer-to-peer connection with the third cloud 222. Peer-to-peer connections may be managed by the clouds, by cloud servers, or by intervening communication infrastructure. In a particular illustrative embodiment, input received from the first user at the first cloud 210 may associate the third cloud 222 with the second cloud 216 to form a group of clouds. The first user may share one or more of the items 212 within the first cloud with the group of clouds instead of sharing such items on a cloud-by-cloud basis. In a particular embodiment, a peer list within one or more of the profiles 214, 220, and 226 may store entries that identify groups of clouds that have been formed. Illustrative examples of peer management and a peer list are further described with reference to FIGS. 3-8.

In a particular embodiment, the system 200 of FIG. 2 may be operable to format content items based on characteristics of a receiving device. For example, each cloud or cloud server may be configured to modify or select a coding/decoding (CODEC) used to encode/decode an item, a resolution of the item, a file format of the item, a compression ratio of the item, or any combination thereof. To illustrate, a particular video file may be provided to a mobile device in a standard definition resolution but the video file may be provided to a set-top box device in a high definition resolution.

The system 200 may thus enable users to peer with different cloud entities supported by multiple service providers via multiple networks. To enable such interworking of different clouds and different providers, the root server 202 may include the shared item database 228 that beneficially stores entries associated with items within different clouds to enable content sharing of such items between clouds. For access-restricted items (e.g., copy-protected or digital rights management (DRM)-protected items) or other secure items, a service provider may provide limited access or may restrict and provide only secure access to authorized users or service subscribers (e.g., for a fee). In one illustrative embodiment, a portion of the shared item database 228 may be available to multiple users without restriction, while another portion (e.g., a restricted portion) of the shared item database 228 may be restricted or otherwise secured for limited access.

Figure 3:
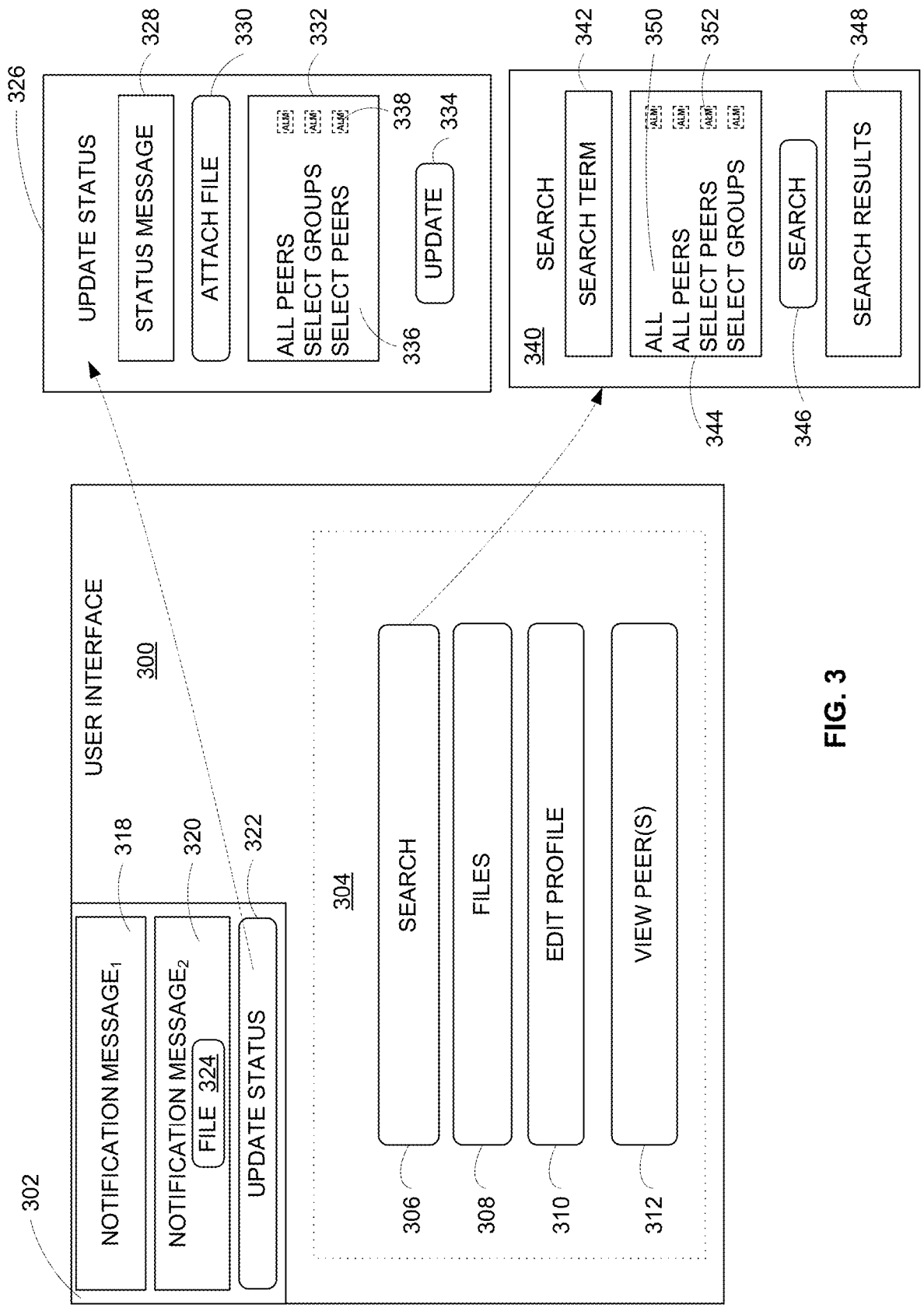
FIG. 3 illustrates a particular embodiment of a graphical user interface associated with a cloud-to-cloud peering system.

Referring to FIG. 3, a particular embodiment of a graphical user interface (GUI) 300 is illustrated. The GUI 300 includes a status window 302 and a set of GUI controls 304, as shown. The set of GUI controls 304 includes a search button 306, a files button 308, a profile button 310, and a view peer(s) button 312. The GUI 300 may be displayed at a display device embedded within or otherwise coupled to a user device that is in communication with a cloud. For example, any of the devices 126-130 or 132-136 of FIG. 1 or devices 230-236 or 238-244 of FIG. 2 may include a display device and other components in order to generate and render the GUI 300.

The status window 302 of the GUI 300 may display one or more notification messages (e.g., illustrative notification messages 318, 320). The one or more notification messages may indicate a current status of one or more clouds, one or more applications executing at one or more clouds, or some other indication of a cloud activity. The status window 302 includes an update status button 322 that, when selected, enables a user (e.g., a first user associated with the first cloud 104) to generate a status message indicating the current status of the user, an application being executed (e.g., at the first cloud 104), or some other indication of a cloud activity (e.g., a video at the first cloud 104 being watched). Notification messages may be communicated from a source cloud to a destination cloud via a peer-to-peer connection between the source cloud and the destination cloud. Further, notification messages from a source cloud may be communicated to any number of destination clouds.

A selection of the update status button 322 may cause the GUI 300 to present an update status window 326. The update status window 326 includes a status message input 328, an attach file control 330, status update designators 332, and an update button 334. The status update designators 332 include a plurality of peer designators 336 and a corresponding plurality of selection designators 338. The peer designators 336 may be used to select one or more clouds that are to receive the status update message (e.g., all peers of the first cloud 104, select peer groups of the first cloud 104, and/or select individual peers of the first cloud 104). The peer designators 336 may be selected using corresponding selection designators 338.

After a status message is input into the status message input 328 and one or more status update designators 332 are selected, selection of the update button 334 may cause the status message to be sent to the selected peers. The status message input 328 may be a textbox or other control into which a user may enter text, symbols, or other information to form an outgoing message. In addition, the user may select the attach file control 330 to attach a file to the message for transmission to the selected peers.

It should be noted that although two notification messages 318, 320 are depicted in FIG. 3, any number of notification messages may be simultaneously displayed at the GUI 300. Such notification messages may disappear after a timeout period or may remain at the GUI 300 until cleared by a user. The notification messages may includes status information associated with the user's personal cloud, status information associated with the user's peer clouds, status information transmitted by a cloud service provider, or any combination thereof. Cloud services offered by a cloud service provider may enable remote storage, retrieval, execution, and sharing of data and applications between subscribers of the cloud service provider.

For example, the notification message 318 may be presented at a display associated with a first user device 126-130 associated with the first cloud 104 of FIG. 1 based on activities occurring at the second cloud 106, a second user device 132-136, or any combination thereof. To illustrate, the second user device 132-136 may be used by a second user to perform a cloud-based action (e.g. creating and storing a presentation at the second cloud 106). The second user may use the GUI 300 displayed at the second user device 132-136 to select the update status button 322 and send a status message to the first cloud 104. The notification message may be relayed from the first cloud 104 to one or more of the first user devices 126-130 and may be displayed as the notification message 318 or 320 at the one or more first user devices 126-130.

Alternatively or in addition, the notification message 318 or 320 may be automatically generated by logic within the second cloud 106, such as logic that identifies a status change of a particular item 124 stored at the second cloud 106. For example, if a particular item 124 has been updated (e.g., a game application has been updated to a revised version), notification of the update may be provided to the first user via the notification message 318 or 320.

In a particular embodiment, the notification message 318 or 320 may include a file indicator 324. The file indicator 324 may be a link, an icon, or other designator indicating or identifying a file that is available for access via the user device that received the notification message 318 or 320. In another particular embodiment, the notification system may be used to communicate textual messages and multimedia links to selected peers or groups of peers (e.g., as part of a cloud-based social networking or instant messaging system).

In response to a selection of the search button 306, the GUI 300 may present a search menu 340. The search menu 340 may include a search term designator 342, a search scope box 344, a search control 346, and a results window 348. For example, the search scope box 344 includes designators 350 to designate whether a search is to be performed across all clouds, all peer clouds, select peer clouds, or selected groups of peer clouds. Each cloud that is included in the search scope may be coupled to the user's cloud via a peer-to-peer connection. Alternately, or in addition, the search menu 340 may enable a user to search clouds associated with individuals listed in an address book or contact list. The search scope window also includes designators 352 to designate which peer groups 350 are to be included in the search. In response to entry of a search query in the search term window 342, a selection of one or more designators 350, 352, and a selection of the search control 346, a search may be conducted and the search results may be displayed in the results window 348. For example, the results window 348 may display information regarding items stored in other clouds that are relevant to the search query, links to such items, or any combination thereof.

In a particular embodiment, the GUI 300 may be generated and presented by executing instructions at a processor. The instructions may be stored on a computer readable storage medium (e.g. at a memory of an electronic device). The GUI 300 may provide access to a first cloud, such as the first cloud 104 of FIG. 1, and may be displayed at a first device (e.g. one of devices 126-130) of a first user associated with the first cloud 104. The GUI 300 includes the status window 302 configured to display information associated with one or more activities of a second cloud (e.g., the second cloud 106) associated with a second user. Further, the GUI 300 includes the search button 306 to present the search menu 340, as described above.

Additionally, the GUI 300 may include the profile button 310 to present attributes of a profile (e.g., the profile 120) stored at the first cloud 104. As described with reference to FIG. 4, a profile stored at cloud may includes attributes specific to a user associated with the cloud, attributes specific to items stored in the cloud, or any combination thereof. The GUI 300 may also include additional buttons, such as buttons associated with the items 118 of the first cloud 104. For example, the files button 308 may be operable to present a files menu. An illustrative embodiment of a files menu is described with reference to FIG. 7. The files menu may provide access to an image library, a video library, one or more applications, one or more games, one or more output devices, a shared storage partition of the first cloud 104, or any combination thereof.

The GUI 300 may also include a view peers button 312. Upon selection of the peer view peers button 312, the GUI 300 may present a peer menu, as described with reference to FIG. 5. The peer menu may provide access to a peer list, a group of peers list, a list of available peer items, one or more notifications, a shared storage partition accessible via one or more peer files, or any combination thereof.

During operation, upon a selection of the search button 306, the GUI 300 presents a search menu 340. A search term may be entered in search term box 342 via an interface to an input device associated with a device presenting the GUI 300, such as any of the devices 126-130. In response to a selection of the search control 346, the instructions stored on the computer readable medium may cause a processor within the device to communicate a search query to a server associated with the first cloud 104. For example, the server may be the cloud server 102 of FIG. 1, the cloud server 204 of FIG. 2, or the cloud server 206 of FIG. 2. Additionally, the cloud server 204, the cloud server 206, or the cloud server 102 may communicate the search query to the root server 202 of FIG. 2. The search query includes the search term. A response may be received in response to the search query, where the response indicates that information relevant to the search term is accessible via a second cloud, such as the cloud 106 of FIG. 1, the cloud 222 of FIG. 2, or the cloud 216 of FIG. 2. The response to the search query and the search results may be presented at the search menu 340 in the search results window 348.

A selection other controls 304 presented by the GUI 300 may cause presentation of additional menus, such as the updates status menu 326 presented in response to selection of the updates status control 322.

It should be noted that the GUI 300 may be presented at various devices (e.g. any of the devices 126-130 of FIG. 1) of a user in communication with a cloud. Moreover, the GUI 300 may be reformatted, resized, etc. based on individual display characteristics of the particular user devices on which the GUI 300 is presented.

The GUI 300 may thus provide a unified and convenient interface that can be presented at various devices. For example, the device may be a set-top box having cloud access via an IPTV network and the GUI 300 may be displayed on a display device (e.g. a television, or other display device) coupled to the set-top box. A user may receive messages from peers associated with other clouds and may send messages to such peers. The GUI 300 may also enable the user to individually and collectively search peer clouds. In a particular embodiment, when the user (e.g., a first user associated with the first cloud 104 of FIG. 1) identifies an item of interest, the user's cloud may communicate a connection request to a peer cloud (e.g. the second cloud 106 of FIG. 1) within which the item is located. In response, a peer-to-peer connection may be established between the user's cloud and the peer's cloud. For example, the peer-to-peer connection may be the peer-to-peer relationship connection 130 of FIG. 1 and/or the peer-to-peer relationship connection 250 of FIG. 2. Upon establishment of the peer-to-peer relationship connection, the item of interest may be accessed at the second cloud from a device of the first user. Alternately, if a peer-to-peer connection already exists between the user's cloud and the peer's cloud, the user may access the item of interest without requesting a new peer-to-peer connection.

Figure 4:
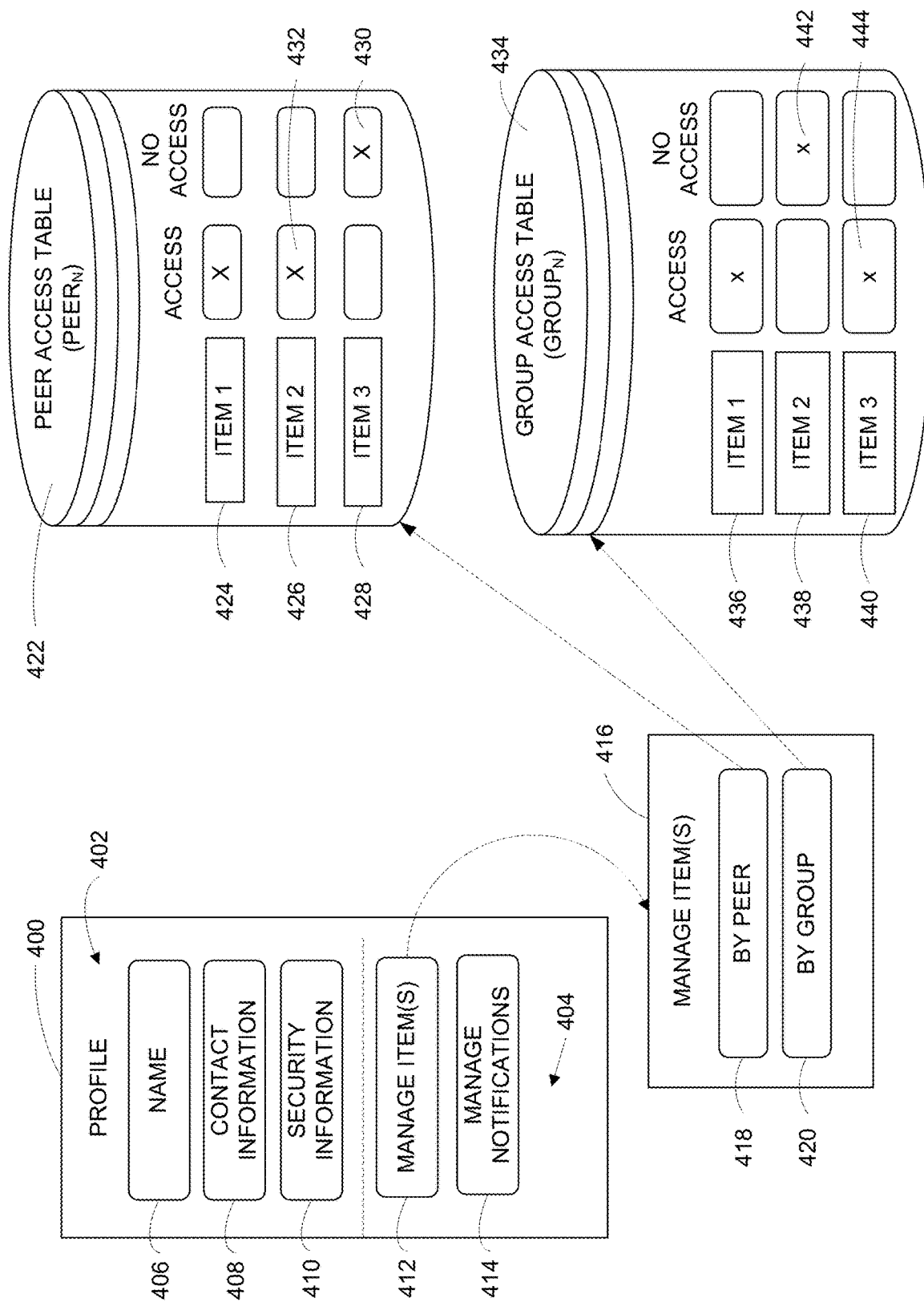
FIG. 4 illustrates a particular embodiment of a profile associated with a cloud-to-cloud peering system.

Referring to FIG. 4, a profile stored at a cloud is illustrated and generally designated 400. In an illustrative embodiment, the profile 400 may be the profile 120 at the first cloud 104 or the profile 122 at the second cloud 106 of FIG. 1. Alternately, the profile 400 may be the profile 214 of the first cloud 210, the profile 220 of the second cloud 216, or the profile 226 of the third cloud 222 of FIG. 2. In a particular embodiment, the profile 400 is displayed in response to selection of the edit profile control 310 at the GUI 300.

The profile 400 may include one or more static or dynamic attributes representing properties of a corresponding user, attributes of items stored in a corresponding cloud, or any combination thereof. To illustrate, the profile 400 may include a plurality of static items 402 representing static attributes of the profile 400. For example, the profile 400 may include illustrative static cloud attributes 406, 408, and 410. In an illustrative example, the cloud attribute 406 may include one or more of a user name, an address, and other subscriber information associated with the first user of a first cloud. The cloud attribute 408 may include contact information associated with the first user, such as one or more of a telephone number, an email address, and an account number. The cloud attribute 410 may include security information, such as a password, an option to reset a password, an option to encrypt contents of the cloud, or any combination thereof.

The profile 400 may also include a plurality of controls 404 representing dynamic attributes of the profile 400. The dynamic attributes may created, deleted, and modified by use of a managed items control 412 associated with managing content items stored at the associated user cloud and by use of a manage notifications control 414 associated with managing incoming and outgoing notifications associated with the user cloud.

Selection of the managed items control 412 may present a manage items menu 416. The manage items menu 416 may include an option 418 to manage items by peer and an option 420 to manage items by group. A selection of the manage items by peer control 418 initiates presentation of a peer access table, such as the peer access table 422 of FIG. 4, where the peer access table 422 is specific to a specific peer. For example, referring to FIG. 1, the peer access table 422 may be included in the profile 120 of the first cloud 104 and may designate access settings for a particular peer of the first cloud 104, such as the second cloud 106. The peer access table 422 may include a plurality of items, designated 424-428, where each item corresponds to an item 118 stored at the first cloud 104. The peer access table may also include a plurality of designators 430, 432 indicating whether access to the corresponding item is granted. For example, items 424 and 426 are indicated as being accessible to the second cloud 106, but item 428 is indicated as not accessible to the second cloud 106.

A selection of the manage items by group control 420 may present a group access table 434. The group access table 434 may function as described above with reference to the peer access table 422, with the exception that settings defined in the group access table 434 may apply to multiple peers that have been clustered by a user into a group of peer clouds. A group access table 434 may be used for each group of peer clouds. Creation and management of cloud groups are further described with reference to FIG. 6. The group access table 434 may include designators 442 and 444 indicating accessibility of the items 436 to 440 to the members of the group of peer clouds. For example, as illustrated in FIG. 4, items 436 and 440 are accessible to each cloud in the group of peer clouds, but item 438 is inaccessible to each cloud in the group of peer clouds.

In a particular embodiment, the manage items menu 416 may also include one or more controls (not shown) operable to manage transitive access settings. For example, the controls may enable a user to indicate that "peers of my peers" are granted access to items in the user's cloud but "peers of peers of my peers" are not granted access to items in the user's cloud. Moreover, such transitive access settings may be defined on a per item, per peer, and per group basis.

During operation, a user may access the profile 400, where the profile 400 is associated with the user's cloud. The user may define grant and deny access to items stored in the user's cloud on a per item, per peer, and per group basis, as described with reference to the peer access table 422 and the group access table 434, respectively.

Thus, the profile 400 may provide the user with a convenient way to manage access to items stored in the user's cloud. For example, the profile 400 may be displayed in response to a selection of the edit profile control 310 at the GUI 300 of FIG. 3 at a device of the user (e.g., a computing device, a mobile phone, a CPE device, or another device).

Figure 5:
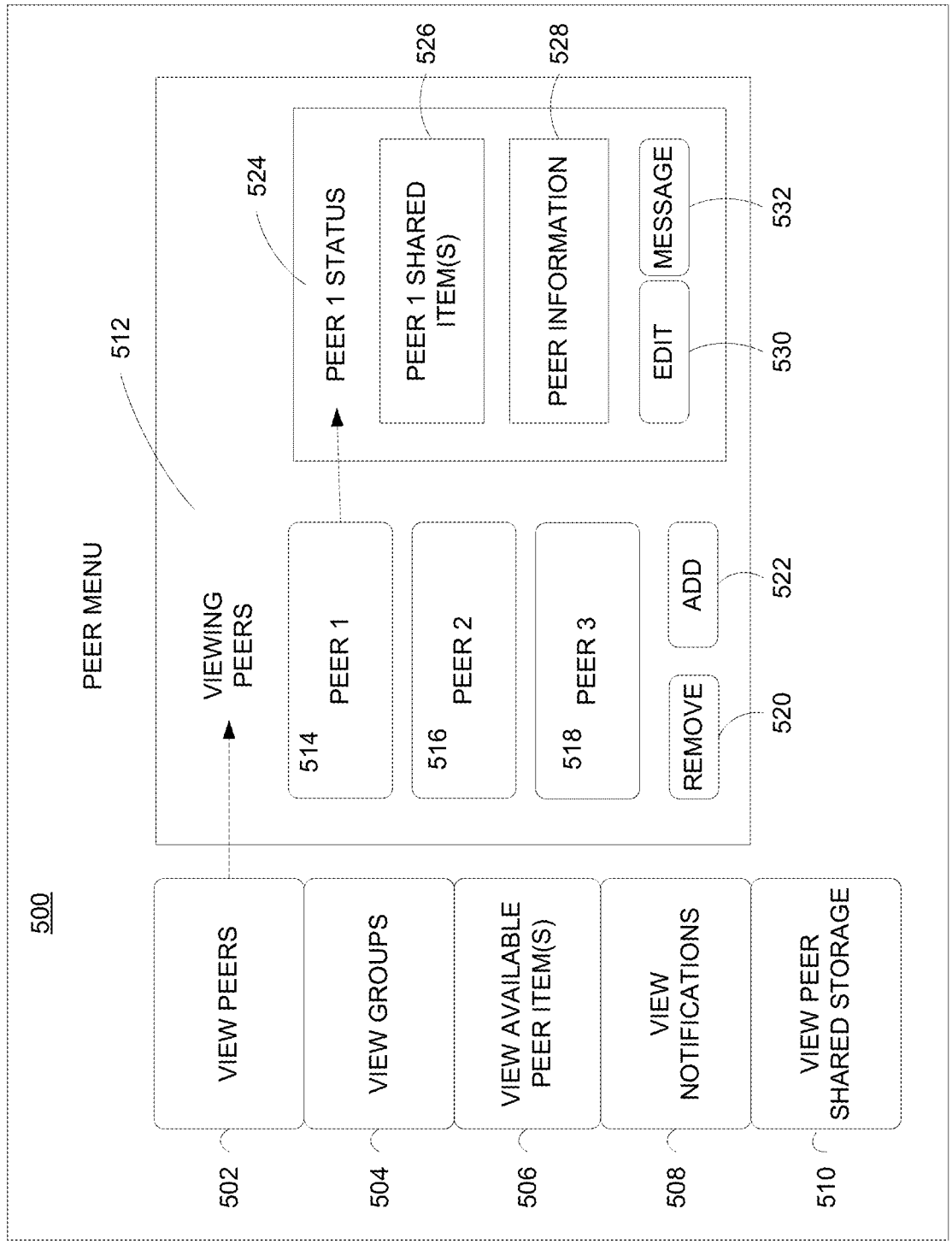
FIGS. 5-8 illustrate graphical user interface views associated with a cloud-to-cloud peering system.

Referring to FIG. 5, an illustrative embodiment of a peer menu 500 is shown. The peer menu 500 may be displayed in response to a selection of the view peer control 312 of the GUI 300. Thus, the peer menu 500 may be displayed at any of the plurality of devices 126-130 associated with the first cloud 104 (or devices having access to any other cloud) shown in FIG. 1. The peer menu 500 includes a plurality of selectable controls 502-510. The plurality of selectable controls includes a view peers control 502, a view groups control 504, a view available peer items control 506, a view notifications control 508, and a view peer shared storage control 510. The peer menu 500 also includes a viewing window 512. The viewing window 512 displays information and additional controls associated with the plurality of selectable controls 502-510.

In an illustrative embodiment, the first cloud 210 of FIG. 2 may receive a request to establish a peer-to-peer connection from a third cloud, such as cloud 222 of FIG. 3. The third cloud 222 may be associated with a third user that is different from the first user associated with the first cloud 210. The first cloud 210 may receive an input via the GUI 300 from a first device, such as the set-top box device 230 of FIG. 2. The input indicates an acceptance of the request received from the third cloud 222 to establish the peer-to-peer connection between the first cloud and the third cloud. In response to the acceptance of the request, an entry may be created in a peer list. An illustrative embodiment of the peer list is displayed in FIG. 5 in the viewing window 512 and includes peers 514-518. Additionally, the peer list may be displayed with an option 520 to remove one or more peers from the peer list and an option 522 to add one or more additional peers to the peer list.

Additionally, the view peers menu may be displayed in response to a selection of the view peers control 502 form the peer menu 500. The view peers menu 500 shown in the viewing window 512 of FIG. 5 includes a second viewing window 524. The second viewing window 524 may be populated with information associated with a particular peer, such as the peer 514. The peer information may include information associated with items stored at a cloud associated with the peer 514 that are accessible to a plurality of devices via the cloud. The peer information displayed in the second viewing window 524 may also include additional information such as peer information 528. The second viewing window 524 also includes an option 530 to edit information associated with the peer 514 and a message option 532 to send a message to the peer 514. Selection of the edit option 530 or the message option 532 may cause the second viewing window 524 to display one or more additional menus (not shown) that include one or more additional controls (not shown).

It should be understood that the peers 514-518 shown in the peer list within the viewing window 512 of FIG. 5 represent clouds associated with users other than the user of the first cloud 210 of FIG. 2. Further, each of the peer clouds 514-518 has established a peer-to-peer connection with the first cloud 210. As explained above with reference to FIG. 3, the GUI 300 provides a convenient and easy way for a user associated with a first cloud (such as the first cloud 104 of FIG. 1 or the first cloud 210 of FIG. 2) to access and manage connections to one or more additional clouds associated with one or more additional users via the peer menu 500, such as by use of the devices 126-130 associated with the first cloud 104 of FIG. 1 or the devices 230-236 associated with the first cloud 210 of FIG. 2. Thus, the peer list displayed in the viewing window 512 of the peer menu 500 allows a user of a first cloud 104 to manage one or more peer-to-peer connections to one or more additional clouds and to modify, view, and access items associated with one or more peer clouds. Further, the second viewing window 524 and the associated peer list of FIG. 5 allow the user to send messages to individual peers, edit information associated with individual peers, and access items stored at each peer cloud.

Figure 6:
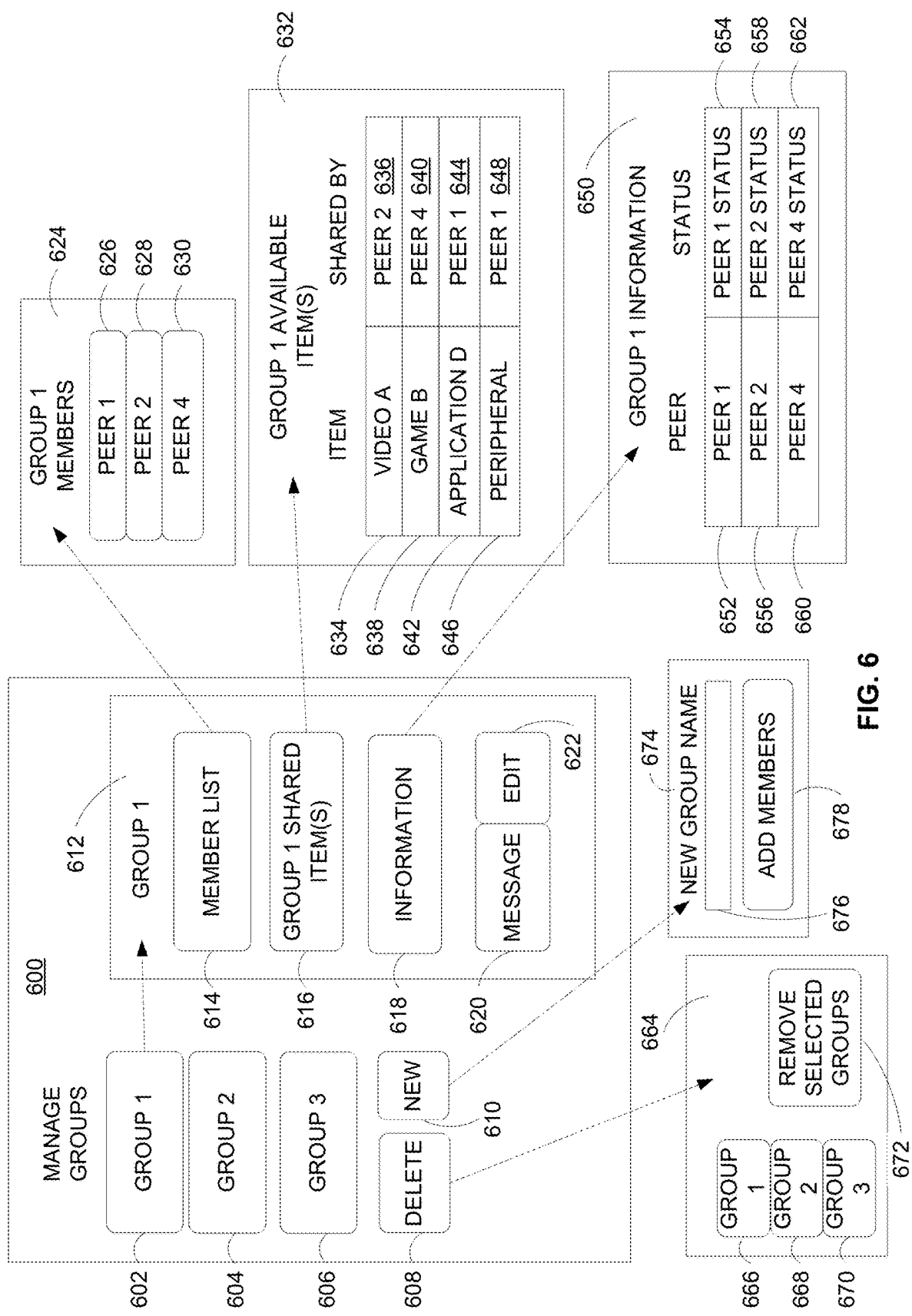

FIG. 6 is an illustrative embodiment of a manage groups menu 600. The manage groups menu 600 may be displayed in response to a selection of the view groups option 504 of the peer menu 500 as shown in FIG. 5. A selection of the view groups option 504 can cause the viewing window 512 to present the manage groups menu 600 at the GUI 300 shown in FIG. 3.

The manage groups menu 600 includes one or more group designators such as the group designators 602-606. The group designators 602-606 identify a group of peer clouds that share a peer-to-peer connection with a first cloud (e.g., any cloud in the system 100 of FIG. 1 or in the system 200 of FIG. 2). Each particular group, such as group 602, includes one or more peers such as the peers 514-518 of FIG. 5. The manage groups menu 600 also includes a delete group option 608 and a new group option 610. The delete group option allows a user to delete one or more groups. The new group option 610 allows a user to create a new group of peers. The manage groups menu 600 also includes a view group window 612 to display options associated with a selection of a particular group from the groups menu 600, such as the first group 602.

The view group window 612 includes a members list control 614 to display a list of the members of the group 602, a view group shared items option 616 to view items shared by members of the group 602, and a group information option 618 to view information associated with the members of the group 602. The view group window 612 also includes a message option 620, and upon selection of the message option 620, a user can send a message to the members of the group 602. The view group window 612 also includes an edit group option 622 that allows a user to edit or modify the group 602.

In response to a user selection of the members list control 614 from the view group window 612, the view group window 612 may be updated to display a group members menu, such as the group members menu 624. The group members menu 624 includes an identifier for each member of the group 602. For example, the group members menu 624 of FIG. 6 includes a first member 626, a second member 628, and a third member 630. Each of the members (i.e., each of the clouds) designated in the group members menu 624 shares a peer-to-peer connection with the first cloud.

In a particular embodiment, a selection of the view group shared items option 616 from the manage groups menu 600 causes the GUI 300 to present an updated view group window 612, such as the group shared items menu 632 of FIG. 6. The group shared items menu 632 includes one or more items, such as items 634, 638, 642, and 646 corresponding to a particular member of the group 602, such as the members 626-630 shown in the view group members menu 624. Item 634 may be a video file corresponding to peer 2 (designated as 636) in the view group shared items menu 632. Thus, item 634 may represent an item stored in a peer cloud (i.e., peer 636) that is accessible to the plurality of devices associated with the first cloud.

The item 638 may be a video game corresponding to peer 4 (designated as 640). The item 642 may be an application corresponding to peer 1 (designated as 644). The item 646 may represent a peripheral device 646 (e.g., the peripheral device 242 associated with the cloud 216 of FIG. 2) that corresponds to peer 1 (designated as 648). Each of the items 634, 638, 642, 646 identified in the view group shared items menu 632 is accessible to one or more user devices associated with the first cloud via a peer-to-peer connection and each of the items 634, 638, 642, and 646 is stored in peer clouds that are different from the first cloud.

The view group window 612 also includes the group information option 618. In response to a selection of the group information option 618, the GUI 300 of FIG. 3 may update the view group window 612 to display status information corresponding to each member of the group 602 in a group information menu 650. As shown, the group information menu 650 displays peer status information 652, 656, and 660 for multiple peers. Each peer status information entry may correspond to a particular member of the group 602. For example, the peer status 654 may correspond to peer 1, (designated 652). The peer status 654 may be associated with information entered by peer 1 via an update status message, as described with reference to the status message 328 of FIG. 3. Additionally, the peer status information 658 and 662 may correspond to statuses of peer 2 (designated as 656) and peer 4 (designated as 660), respectively.

It should be understood that the foregoing description of the view group members menu 624, the group shared items menu 632, and the view group information window 650 is provided with reference to members of the group 602, and similar menus, information, and options may be displayed in response to a selection of the group 604 or the group 606.

A selection of the delete control 608 from the manage groups menu 600 may present a menu within the view group window 612 to remove one or more of the groups 602-606. For example, the remove selected groups menu 664 includes a first group 666, a second group 668, and a third group 670. In a particular embodiment, the first group 664 may correspond to the group 602, the second group 668 may correspond to the group 604, and the third group 670 may correspond to the group 606. A selection of the one or more of the groups 666-670 from the remove selected groups menu 664 may indicate that the selected group(s) is to be removed from the manage groups menu 600. For example, once a selection of the desired groups has been made at the remove selected groups menu 664 and a removed selected groups control 672 is selected, the selected groups may be removed from the groups menu 600. It should be understood that groups may depict logical associations of peers associated with a cloud and that removal or deletion of a particular group may not remove the association (and peer-to-peer connections) between the peers of the deleted group and the cloud. For example, even though a particular group of clouds is deleted, the clouds may remain members of other groups, and thus peer-to-peer connections with the clouds of the deleted group may not be removed.

A selection of the new group control 610 from the manage groups menu 600 may cause the GUI 300 of FIG. 3 to update the view groups window 612 to display a new group menu 674. The new group menu 674 may include a new group name designator 676 and an add members control 678. The new group name designator 676 is configured to receive data in the form of text, symbols, or any other kind of identifier to be used to identify the new group. The identifier may be indicative of logical associations that members of the group have with each other. For example, a group name may correspond to co-workers, friends, family members, or some other association to be designated by a user of a cloud. Group members may be added to the new group using the add members control 678. For example, creating the group 602 may involve selecting the add members control 678 and then selecting peer 1 (designated 626), peer 2 (designated 628), and peer 4 (designated 630) in one or more additional menus (not shown). Such additional menus may include one or more additional controls to carry out the functions described above with reference to adding members to the new group.

In a particular embodiment, an input may be received at a cloud, such as the first cloud 104 of FIG. 1 or the first cloud 210 of FIG. 2, indicating that a particular peer is to be added to a group of clouds (e.g., the group 602). As shown, the group members list associated with the group 602 includes peers 1, 2, and 4 (designated 626, 628, and 630, respectively). The input may indicate that a "new" peer 3 (not shown) is to be added to the group 602. The input may be received using the edit control 622 of the view group window 612, as shown. Selection of the edit control 622 may cause an updated presentation of the view group window 612 including an option to add peer 3 to the group 602. After adding peer 3 to the group 602, the group members menu 624 would include peer 3 in addition to peers 1, 2, and 4.

Thus, the manage groups menu 600 of FIG. 6 may enable a user associated with a cloud to manage connections and associations between the cloud and one or more additional clouds. The menu 600 may also enable access to items stored in the additional clouds and viewing of status information associated with each member of a group of clouds. Additionally, the menu 600 may enable users to conveniently and quickly perform such tasks and access the above-described features using a GUI, such as the GUI 300 of FIG. 3. To illustrate, a user may create groups based on logical associations of one or more peers that are connected to the user's cloud via peer-to-peer connections. Further, the user may conveniently access, modify, and remove such logical associations of peer groups via the GUI.

Figure 7:
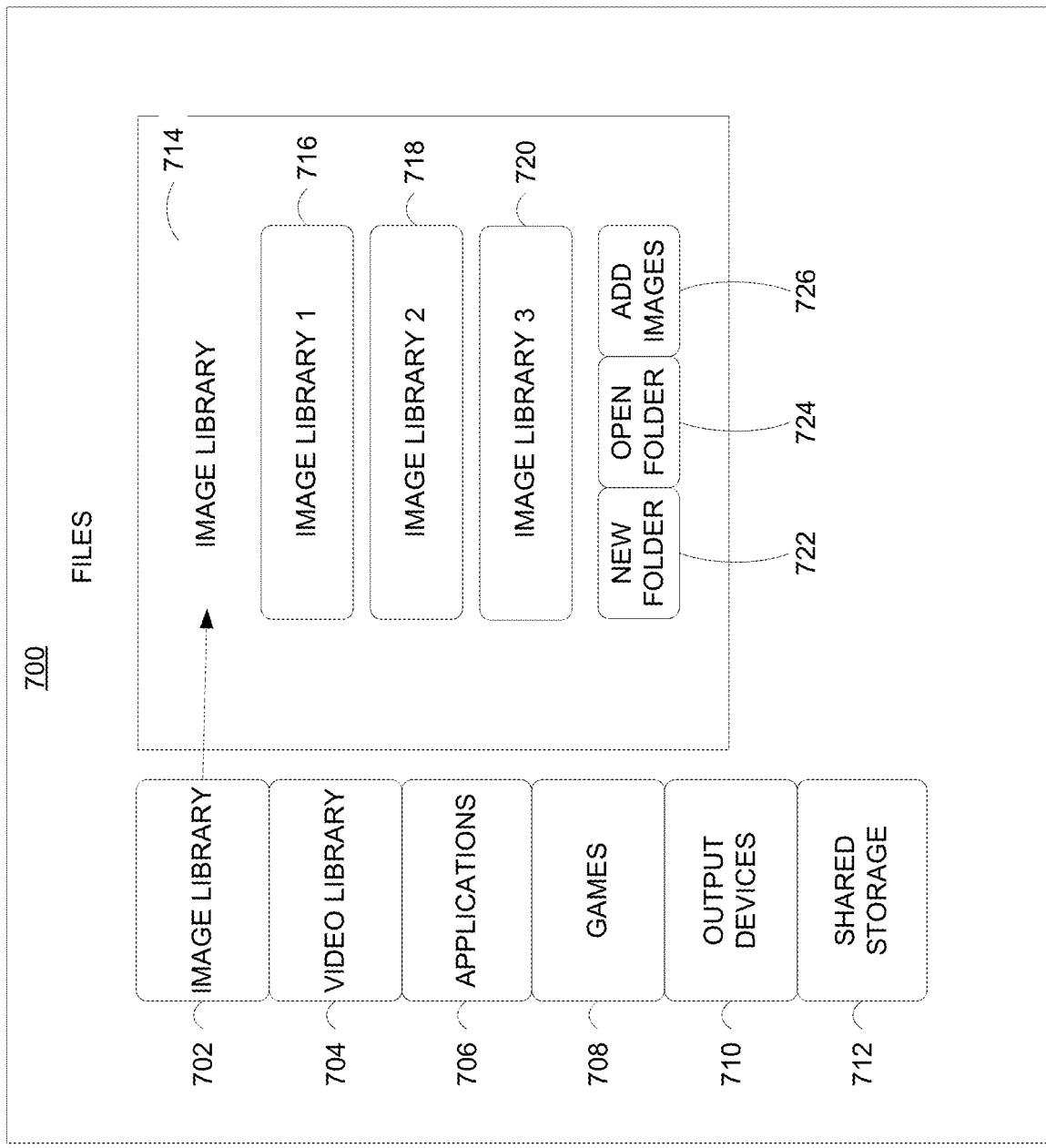

Referring to FIG. 7, an illustrative embodiment of a files menu is shown and is generally designated 700. The files menu 700 may be displayed in response to a selection of the files control 308 from the GUI 300 of FIG. 3. The files menu 700 may be accessed via the GUI 300 of FIG. 3 from one of the plurality of devices 126-130 associated with first cloud 104 of FIG. 1 or from one of the plurality of devices 230-236 associated with the first cloud 210 of FIG. 2.

The files menu 700 may include a plurality of controls 702-712. The plurality of controls may include an image library control 702, a video library control 704, an applications library control 706, a games library control 708, an output devices control 710, and a shared storage partition control 712. The files menu 700 may also include a viewing window 714. The viewing window 714 may be populated with information and additional controls based on a selection of a particular control from the plurality of controls 702-712.

For example, as shown in FIG. 7, a selection of the image library control 702 may present an image library menu in the viewing window 714. The image library menu 714 may include one or more additional controls 716-720 associated with accessing image libraries stored at a cloud. The image library menu 714 may also include a create new folder control 722, an open folder control 724, and an add images or libraries control 726.

In an illustrative embodiment, a user may create an image library that includes one or more images by selecting the create new folder control 722 and uploading the one or more images to the cloud. Selection of the create new folder control 722 may cause the viewing window 714 to be populated with one or more additional menus corresponding to options to configure and upload the one or more images to the new image library.

In another illustrative embodiment, the image libraries 716-720 may be selected individually or in combination and may be opened using the open folder control 724. Alternatively, an image library, such as the first image library 716, may be opened by a command (e.g., a double-click command received via a mouse or other input device) in the viewing window 714. Additionally, a selection of both the image library 716 and the image library 718 followed by a selection of the open folder control 724 may cause the viewing window 714 to be populated with combined contents of the image libraries 716 and 718.

Additionally, images may be added to an existing image library, such as the second image library 718, by selection of the add images control 726. In response to such a selection, the viewing window 714 may display one or more additional menus that include one or more additional controls to facilitate adding additional images to the second image library 718.

Similarly, in response to a selection of one of the other controls 704-712, the viewing window 714 may be modified or updated to present additional controls. For example, a selection of the video library control 704 may populate the viewing window 714 with one or more video libraries that function as described with reference to the image libraries 716-720. In a particular embodiment, when the user views a particular video in the viewing window 714, the viewing window 714 may display a notification message identifying one or more peers that are also viewing the particular video. Alternately, or in addition, the notification message may include a control that enables the user to search (e.g., within a cloud-based social network) for peers that are viewing or have demonstrated an interest in the particular video. When the user accesses the cloud via an IPTV network, the notification message may be transmitted via unicast or multicast.

In another particular embodiment, the viewing window 714 may enable the user to engage in screen-sharing with one or more peers. For example, the viewing window 714 may include a control that is operable to replicate contents of the viewing window 714 (including any images, videos, applications, or games displayed therein) in viewing windows of other peers. Thus, the menu 700 may enable multiple peers to view content (e.g., live media content or digital video recorder (DVR) content) in a synchronized fashion. It should be noted that although FIG. 7 depicts a viewing window, images, videos, applications, and games may also be viewed and executed in one or more additional windows or viewing modes (e.g., a fullscreen viewing mode).

In a particular embodiment, the viewing window 714 (or other control at the GUI 300 of FIG. 3) may enable the user to temporarily grant administrative control of the user's cloud to a peer. For example, a user may temporarily grant control to a peer to enable the peer to help the user move past a specific point in a game or to troubleshoot a particular application. The user may grant control to the peer on a time-restricted basis (e.g., "for the next 10 minutes"), an action-controlled basis (e.g., "until the peer beats level 10 of the game"), on an indefinite basis (e.g., "until I take back control"), or any combination thereof.

Figure 8:
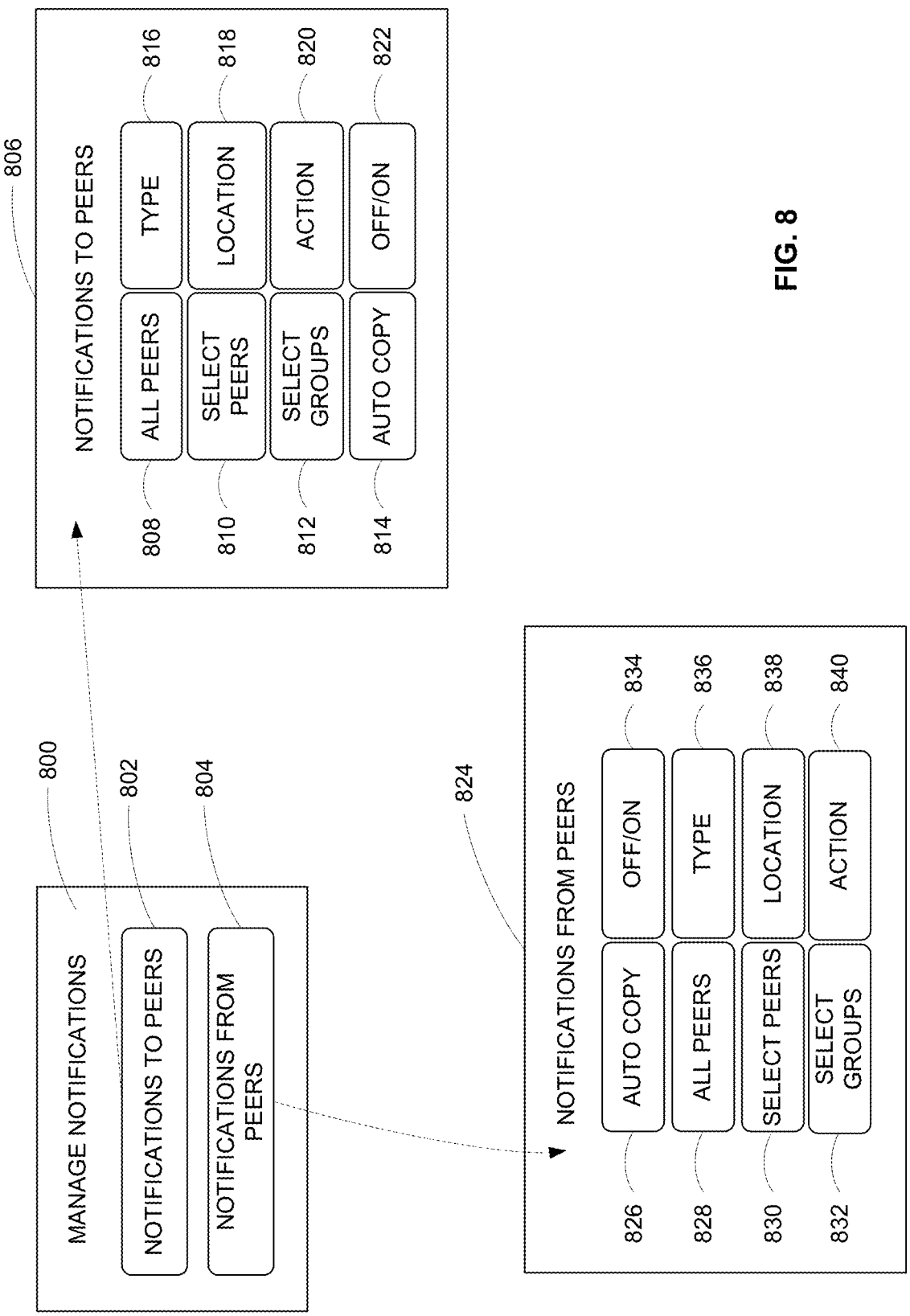

Referring to FIG. 8, an illustrative embodiment of a manage notifications menu 800 is shown. The manage notifications menu 800 may include a manage outgoing notifications control 802 to configure a plurality of options associated with notification messages sent from a cloud to one or more other clouds. Additionally, the manage notifications menu 800 may include a manage incoming notifications control 804 to manage notifications received from one or more peer clouds. In a particular embodiment, the manage notifications menu 800 is displayed in response to a selection of the edit profile control 310 of FIG. 3 followed by a selection of the manage notifications control 414 of FIG. 4.

In an illustrative embodiment, a notifications to peers menu 806 is displayed in response to a selection of the manage outgoing notifications control 802. The manage notification to peer menu 806 may include a plurality of controls 808-822. The plurality of controls 808-822 may be operable to configure outgoing notifications to peers on an all-peers ("ALL PEERS") basis, a peer-by-peer ("SELECT PEERS) basis, a group ("SELECT GROUPS") basis, an item type ("TYPE") basis (e.g., audio type, video type, game type, application type, etc.), a storage location ("LOCATION") basis (e.g., a particular shared storage folder or region of the cloud), an action ("ACTION") basis (e.g., upload, modify, delete, download, view, execute, etc.), or any combination thereof.

In addition, the OFF/ON control 822 may enable the user to conveniently turn off or turn on all outgoing notifications. Additionally, an AUTO COPY control 814 may cause the cloud to automatically copy one or more items (e.g., files, applications, games, etc.) stored at the cloud to one or more peer clouds when such items are added or modified at the user's cloud. For example, an addition of a particular video file via the video library control 704 of FIG. 7 may trigger automatic copying of the uploaded video file to all peer clouds, selected peer clouds, or group of clouds based on a type of the video file, a location to which the video file was uploaded, or any combination thereof.

It should be understood that each of the controls 808-822 can be used in combination with each of the other controls or individually. Thus, the manage notifications menu 800 may provide the user with granular control of outgoing notifications.

Similarly, the manage notifications from peers menu 824 may be displayed in response to a selection of the manage incoming notifications control 804. The manage notifications from peers menu 824 may include a plurality of controls 826-840. The plurality of controls 826-840 may be operable to configure incoming notifications from peers on an all-peers ("ALL PEERS") basis, a peer-by-peer ("SELECT PEERS) basis, a group ("SELECT GROUPS") basis, an item type ("TYPE") basis (e.g., audio type, video type, game type, application type, etc.), a storage location ("LOCATION") basis (e.g., a particular shared storage folder or region of the cloud), an action ("ACTION") basis (e.g., upload, modify, delete, download, view, execute, etc.), or any combination thereof. In addition, the OFF/ON control 834 may be used to turn off and turn on incoming notifications, and the AUTO COPY control 826 may be used to configure from which peer clouds auto copying is enabled to the user's cloud. The AUTO COPY control 826 may also enable the user to specify a particular location (e.g., folder) in the user's cloud to which an item is automatically copied.

It should be understood that each of the controls 826-840 can be used in combination with each of the other controls or individually. Thus, the manage notifications menu 800 may provide the user with granular control of incoming notifications.

In a particular embodiment, the GUI 300 of FIG. 3 and associated views/controls described with reference to FIGS. 4-8 may include marketing or sponsored advertising messages, at the discretion of a cloud service provider.

It will be appreciated that the various GUI controls described with reference to FIGS. 3-8 may enable deterministic generation and receipt of notifications. For example, a user may configure one or more options associated with a particular peer using the peer access table 422 of FIG. 4. To illustrate, the user may make a selection using the designator 432 associated with item 426 of the peer access table 422 to indicate that item 426 is accessible to the particular peer. In response to saving the modified peer access table entry associated with item 426, the user's cloud may generate a first notification message and send the notification message to the particular peer's cloud. The notification message may indicate that the item 426 at the user's cloud has been made accessible to one or more devices associated with the peer. The notification message (e.g., the status notification message 318 of FIG. 3) may be sent from the user's cloud to the peer's cloud via a peer-to-peer connection as determined by the user's outgoing notification settings (e.g., controlled via the controls 808-822). The notification message may be displayed at a particular device of the peer via a GUI (e.g., the GUI 300 of FIG. 3) as determined by the peer's incoming notification settings (e.g., controlled via the controls 826-840). In response to receiving the status notification message 318, the peer may access the shared item via streaming, download, automatic copying, screen-sharing, or any combination thereof. To illustrate, a shared multimedia file may be accessible via the view peers control 502 of FIG. 5 or via another control (e.g., the file indicator 324).

The various GUI views and controls described with reference to FIGS. 3-8 may be accessed from various user devices via various networks. For example, a user may access the GUI views and controls from a set-top box device via an IPTV network. Thus, an IPTV service provider may leverage the disclosed systems and methods to facilitate cloud-based social networking via the IPTV network. For example, a triple-play (e.g., video, voice, and data) service provider may thereby provide "quad-play" service (e.g., video, voice, data, and cloud-based services).

Figure 9:
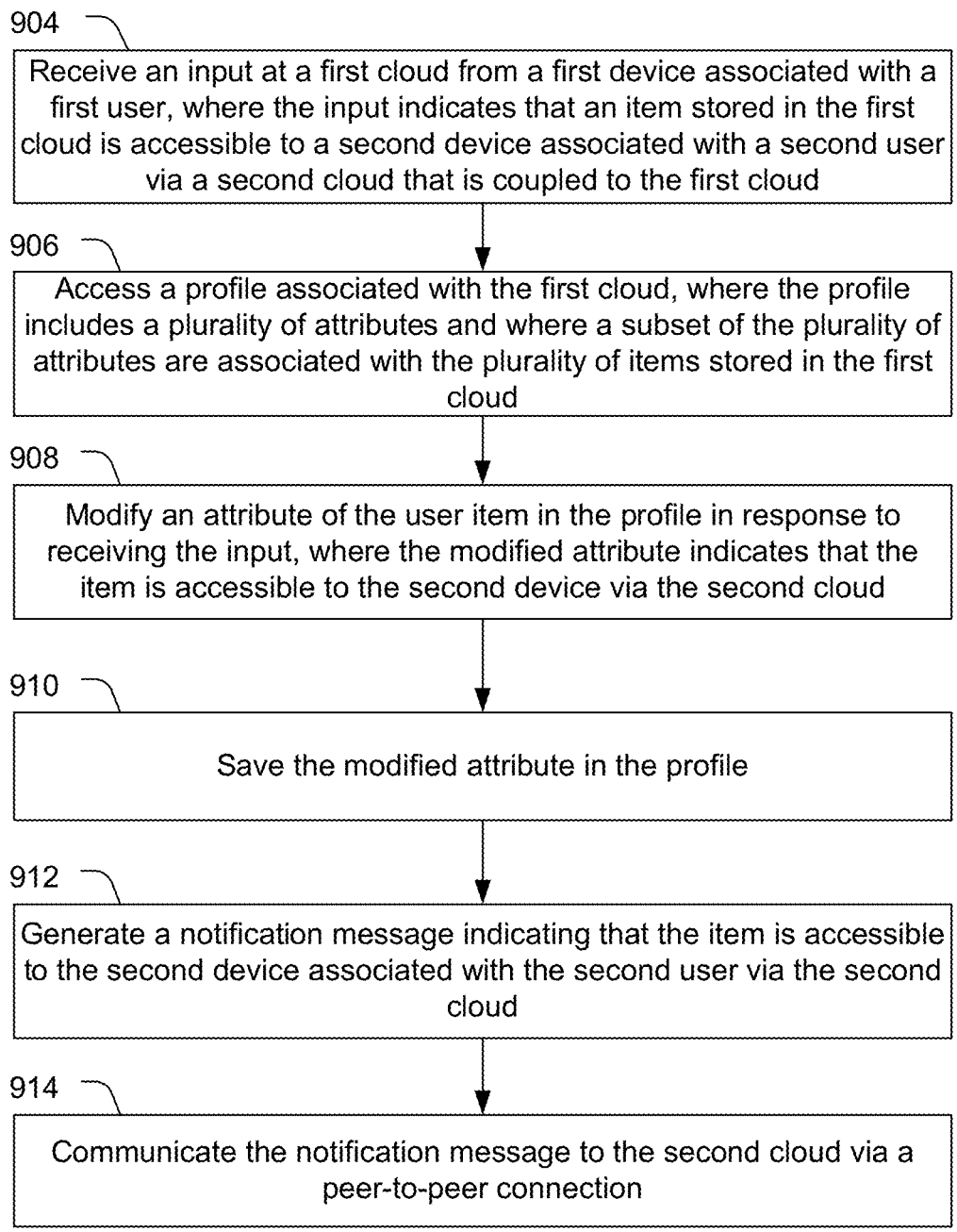
FIG. 9 is a flow chart of a particular embodiment of a cloud-to-cloud peering method.

Referring to FIG. 9, a particular illustrative embodiment of a method of sharing items between clouds is illustrated and generally designated 900. In a particular embodiment, the method 900 may be performed at the system 100 of FIG. 1 or the system 200 of FIG. 2 and may be illustrated in reference to the interfaces and controls described with reference to FIGS. 3-8.

The method 900 may include receiving an input at a first cloud from a first device, at 904. The first device may be associated with a first user, and the input may indicate that an item stored in the first cloud is accessible to a second device associated with a second user via a second cloud. The second cloud may be coupled to the first cloud. For example, in FIG. 1, the input may be received at the first cloud 104 from a first device (e.g., any of devices 126-130), where the input indicates that an item 118 stored in the first cloud 104 is accessible to a second device (e.g. any of devices 132-136) via the second cloud 106.

The method 900 may also include accessing a profile associated with the first cloud, at 906. The profile may include a plurality of attributes and a subset of the plurality of attributes may be associated with the items stored in the first cloud. For example, in FIG. 1, the profile 120 associated with the first cloud 104 may be accessed. A subset of attributes stored in the profile 120 may be associated with the items 118 stored in the first cloud 104. In an illustrative embodiment, the profile may correspond to the profile 400 of FIG. 4.

The method 900 may further include modifying an attribute of the item in the profile, at 908. For example, the attribute may be modified in response to receiving the input, and the modified attribute may indicate that the item is accessible to the second device via the second cloud. For example, in FIG. 1, an attribute of the item in the profile 120 may be modified.

The method 900 may include saving the modified attribute in the profile, at 910, and generating a notification message, at 912. The notification message may indicate that the item is accessible to the second device associated with the second user via the second cloud. For example, in FIG. 1, the notification message may indicate that the item is accessible to the second device (e.g. any of devices 132-136) via the second cloud 106. In a particular embodiment, the notification message may be formatted, generated, and displayed as described with reference to the notification messages 318 and 320 of FIG. 3.

The method 900 may also include communicating the notification message to the second cloud via a peer-to-peer connection, at 914. For example, in FIG. 1, the notification message may be communicated to the second cloud 106 via the peer-to-peer connection 138.

Additional operations may also be performed in response to receiving user input at a cloud. In one embodiment, receiving input at a user's cloud indicating that an item stored in the user's cloud is to be shared with a peer cloud may trigger automatically copying the item from the user's cloud to the peer's cloud. In another particular embodiment, input may be received to associate multiple clouds to form a group of clouds and to indicate that one or more items stored in the user's cloud are to be shared with one or more groups of clouds.

Referring to FIG. 10 a particular embodiment of the method of searching one or more clouds for items of interest is illustrated and generally designated 1000. For example, the method 1000 may be performed at the system 100 of FIG. 1 or the system 200 of FIG. 2 and may be illustrated with reference to the user interfaces and controls described with reference to FIGS. 3 to 8.

The method 1000 may include presenting a graphical user interface (GUI) at a display of a first device associated with a first user, at 1002. For example, the GUI may be the GUI 300 of FIG. 3 and may be displayed at a first device (e.g., any of devices 126-130) of FIG. 1.

The method 1000 may also include presenting a search menu response to a selection of a search button, at 1004. For example, with reference to FIG. 3, the search menu 340 may be presented in response to the selection of the search button 306.

The method 1000 may further include receiving a search term at the search menu from the first device via network. For example, with reference to FIG. 3, the search term 342 may be received at the search menu 340 via a network, such as any of the networks described with reference to FIG. 1-2 (e.g. the Internet, an IPTV network or other television network such as a cable, satellite, or terrestrial distribution network, or a wireless mobile network).

The method 1000 may include communicating a query to a server associated with the first cloud, at 1008, where the query may include the search term. For example, with reference to FIG. 1, a query may be communicated to the cloud server 102. The method 1000 may also include receiving a response to the query from the server, at 1010. The response may include or identify information relevant to the search term. For example, with reference to FIGS. 1 and 3, a response to the query may be received from the cloud server 102, where the response includes information relevant to the search term and where such information is displayed in the results window 348.

Figure 11:
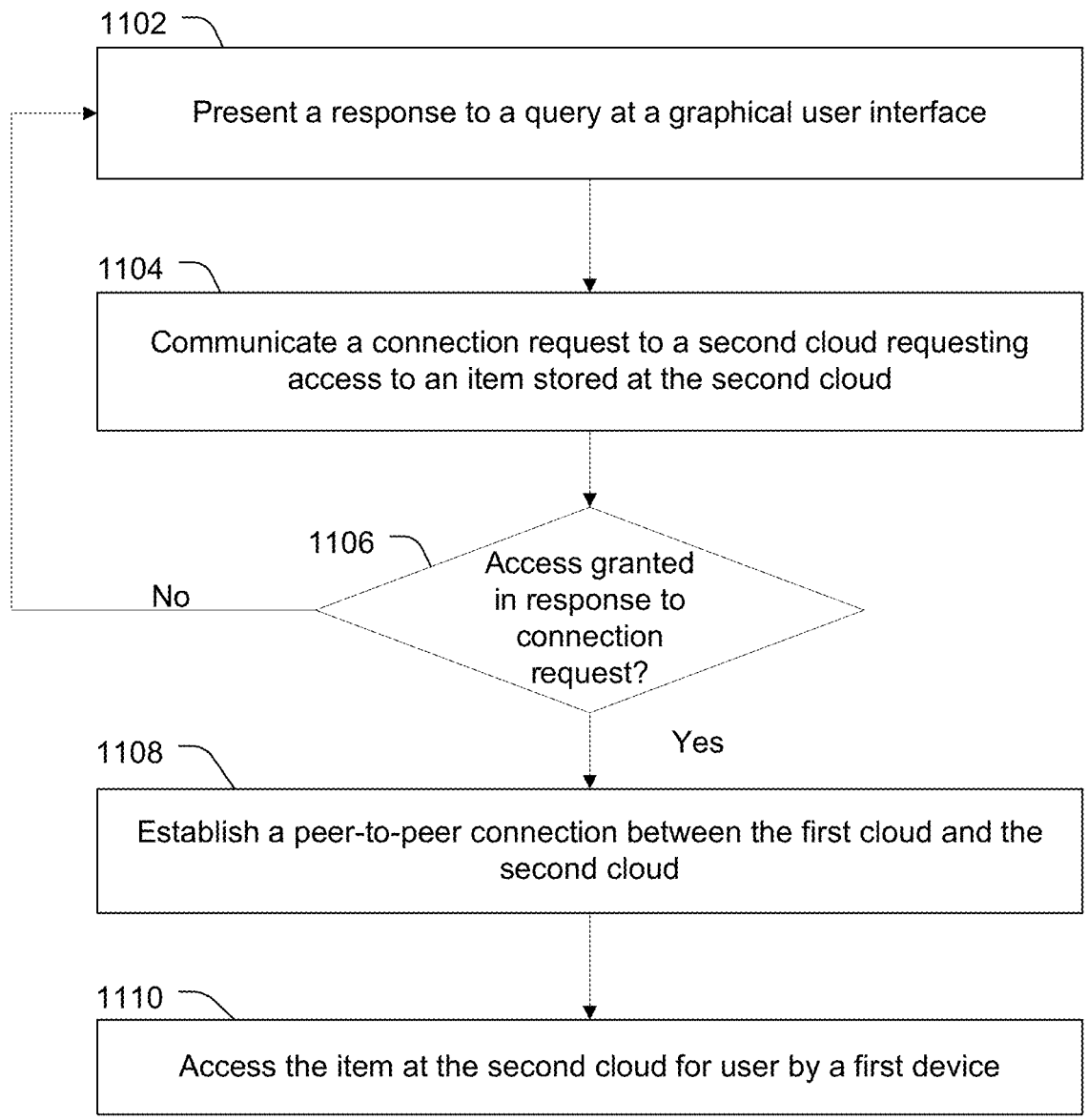
FIG. 11 is a flow chart of another particular embodiment of a cloud-to-cloud peering method.

Referring to FIG. 11, a particular illustrative embodiment of a method of establishing a peer-to-peer connection between clouds is described and generally designated 1100. The method 1100 may be performed at the system 100 of FIG. 1 or the system 200 of FIG. 2 and may be illustrated with reference to the user interfaces and controls described with reference to FIGS. 3-8.

The method 1100 may include presenting a response to a query at a graphical user interface (GUI), at 1102. For example, the response may be presented at the GUI 300 of FIG. 3 in response to a search query entered via the search term box 342 of FIG. 3.

The method 1100 may also include communicating a connection request to a second cloud, at 1104. The request may be a request to access an item stored at the second cloud. For example, the second cloud may be the second cloud 106 of FIG. 1, and the request may a request to access to an item 124 stored at the second cloud 106.

The method 1100 may further include determining whether access is granted in response to the connection request, at 1106. When it is determined that access is not granted, the method 1100 may return to 1102. Alternately, when it is determined that access is granted, the method 1100 may establish a peer-to-peer connection between the first cloud and the second cloud, at 1108. For example, in FIG. 1, the peer-to-peer connection 138 may be established between the first cloud 104 and the second cloud 106.

The method 1100 may include accessing the item at the second cloud for use by a first device, at 1110. For example, in FIG. 1, the item 124 at the second cloud 106 may be accessed by a first device (e.g. any of devices 126-130) of the first user of the first cloud 104.

Figure 12:
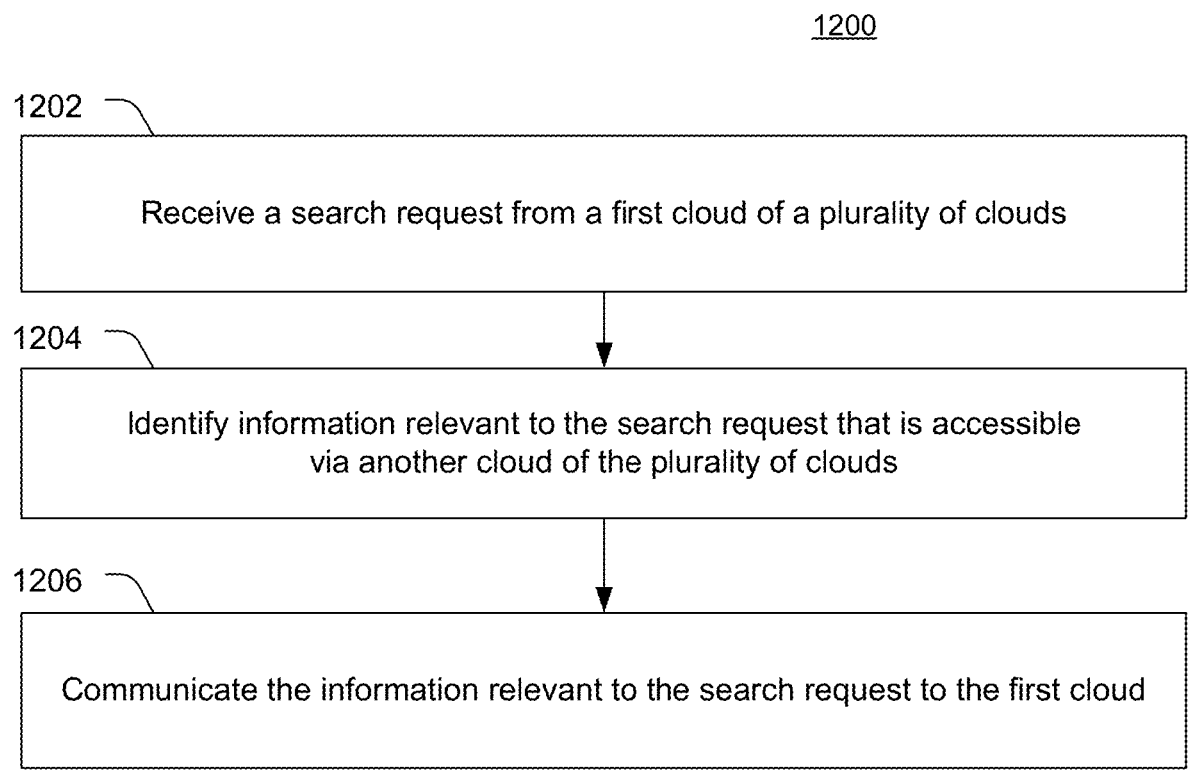
FIG. 12 is a flow chart of another particular embodiment of a cloud-to-cloud peering method.

Referring to FIG. 12, a particular embodiment of a method of searching one or more clouds for items of interest is illustrated and generally designated 1200. In an illustrative embodiment, the method 1200 of FIG. 12 may be performed at the system 100 of FIG. 1 or the system 200 of FIG. 2 and may be illustrated with reference to the user interfaces and controls described with reference to FIGS. 3-8.

The method 1200 may include receiving a search request from a first cloud of a plurality of clouds, at 1202. For example, the first cloud may be the first cloud 104 of FIG. 1. The method 1200 may also include identifying information relevant to the search request that is accessible via another cloud of the plurality of clouds at 1204. For example, the other cloud may be the second cloud 106 of FIG. 1.

The method 1200 may further include communicating the information relevant to the search request to the first cloud, at 1206. For example, information relevant to the search request may be communicated to the first cloud 104 of FIG. 1 and may be displayed at a user device associated with the first cloud (e.g., any of the devices 126-130) via the search results window 348 of FIG. 3.

Figure 13:
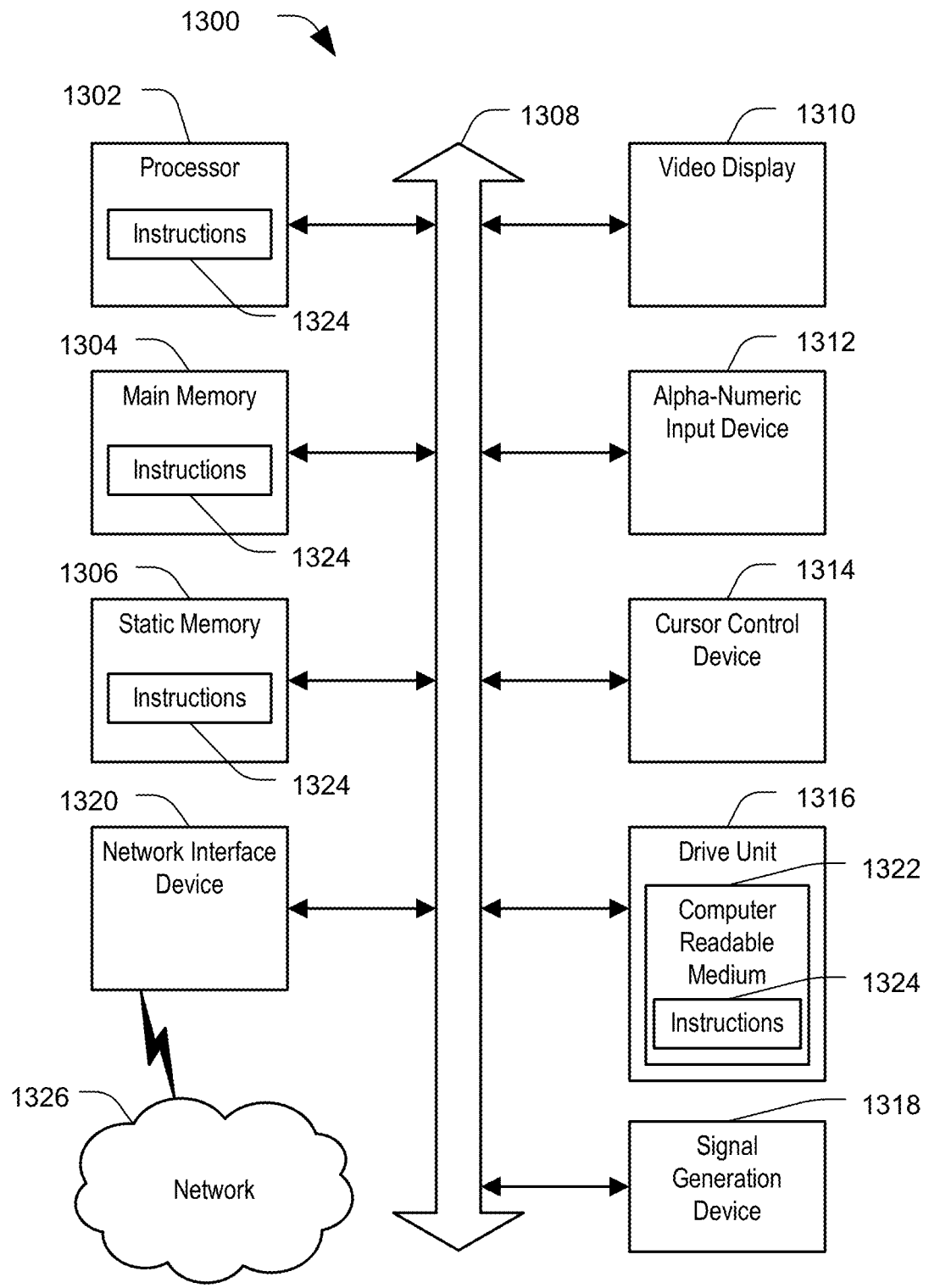
FIG. 13 is a block diagram of an illustrative embodiment of a computer system operable to support the various methods, systems, and computer readable media disclosed with respect to FIGS. 1-12.

Referring to FIG. 13, an illustrative embodiment of a computer system is shown and designated 1300. The computer system 1300 can include a set of instructions that can be executed to cause the computer system 1300 to perform any one or more of the methods or computer based functions disclosed herein. The computer system 1300 may operate as a standalone device or may be connected, e.g., using a network, to other computer systems or peripheral devices. For example, the computer system 1300 or portions thereof may implement, include, or be included within any one or more of the devices, servers, and clouds illustrated in FIGS. 1-2.

In a networked deployment, the computer system 1300 may operate in the capacity of a server or as a client user computer in a server-client user network environment, or as a peer computer system in a distributed peer-to-peer or cloud-to-cloud network environment. The computer system 1300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1300 can be implemented using electronic devices that provide voice, video or data communication. Further, while a single computer system 1300 is illustrated, the term "system" shall also be taken to include any collection of systems or sub-systems that individually or jointly execute a set, or multiple sets, of instructions to perform one or more computer functions.

As illustrated in FIG. 13, the computer system 1300 may include a processor 1302, e.g., a central processing unit (CPU), a graphics processing unit (GPU), or both. Moreover, the computer system 1300 can include a main memory 1304 and a static memory 1306 that can communicate with each other via a bus 1308. As shown, the computer system 1300 may further include a video display unit 1310, such as a liquid crystal display (LCD), an organic light emitting diode (OLED), a flat panel display, or a solid state display. The video display unit 1310 may be operable to display various GUIs and GUI controls disclosed herein, such as the GUIs and GUI controls described with reference to FIGS. 3-8. Additionally, the computer system 1300 may include an input device 1312, such as a keyboard, and a cursor control device 1314, such as a mouse. Such input devices may enable interaction with various GUIs and GUI controls, such as the GUIs and GUI controls described with reference to FIGS. 3-8. The computer system 1300 can also include a disk drive unit 1316, a signal generation device 1318, such as a speaker or remote control, and a network interface device 1320.

In a particular embodiment, as depicted in FIG. 13, the disk drive unit 1316 may include a computer-readable medium 1322 in which one or more sets of instructions 1324, e.g. software, can be embedded. Further, the instructions 1324 may embody one or more of the methods or logic as described herein, such as the methods described with reference to FIGS. 9-12. In a particular embodiment, the instructions 1324 may reside completely, or at least partially, within the main memory 1304, the static memory 1306, and/or within the processor 1302 during execution by the computer system 1300. The main memory 1304 and the processor 1302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1324 so that a device connected to a network 1326 can communicate voice, video or data over the network 1326. Further, the instructions 1324 may be transmitted or received over the network 1326 via the network interface device 1320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any non-transitory medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
    modifying, by a first device, an auto copy mode of a user profile associated with first equipment operating from a first cloud via a graphical user interface provided by a cloud server;
    modifying, by the first device, a first data item stored at the first cloud, wherein the cloud server directs the first equipment operating at the first cloud to transmit, via peer-to-peer communication, the first data item stored in the first cloud to second equipment operating from a second cloud responsive to the modifying the first data item according to the auto copy mode, wherein the first cloud is supported by first service provider, and the second cloud is supported by a second service provider;
    modifying, by the first device, a notification mode of the user profile via the graphical user interface generated by the cloud server;
    receiving, by the first device, a viewing notification from the first equipment operating the first cloud, wherein the viewing notification is transmitted from the second equipment operating the second cloud via peer-to-peer communication;
    selecting, by the first device, a link to a second data item associated with the viewing notification;
    receiving, by the first device, a data stream associated with the second data item from the first equipment operating from the first cloud, responsive to the selecting the link to the second data item, wherein the second data item is provided to the first equipment operating from the first cloud by the second equipment operating from the second cloud via peer-to-peer communication;
    receiving, by the first device, third data from the first equipment operating from the first cloud, wherein the third data is associated with an accessibility restriction corresponding to a second item of at least one of the first cloud or the second cloud, wherein the accessibility restriction indicates that a first portion of the second item is accessible to the first device and a second portion of the second item is inaccessible to the first device, wherein the second item corresponds to a database storing entries associated with items in equipment operating from a plurality of clouds, and wherein the first equipment operating from the first cloud and the second equipment operating from the second cloud are included in the equipment operating from the plurality of clouds; and
    receiving, by a processing system, a third item at the first device from the at least one of the first cloud or the second cloud, wherein the third item comprises content formatted according to one or more characteristics of the first device.

2. The method claim 1, wherein the first portion corresponds to a first subset of entries associated with items the first device is authorized to access.

3. The method of claim 2, wherein the second portion corresponds to a second subset of entries associated with items the first device is not authorized to access.

4. The method of claim 3, wherein the third data indicates that a first user associated with the first device has not paid a fee required to access the items in the second subset of entries.

5. The method of claim 1, wherein the first cloud corresponds to a first user account associated with a first user, wherein the second cloud corresponds to a second user account associated with a second user, and wherein the second item is stored at the first cloud.

6. The method of claim 1, wherein the content is formatted by at least one of the first equipment operating from the first cloud or the second equipment operating from the second cloud, wherein the formatting is via at least one of utilizing a coder-decoder (CODEC) configured according to the one or more characteristics of the first device, utilizing a resolution according to the one or more characteristics of the first device, utilizing a file format according to the one or more characteristics of the first device, or utilizing a compression ratio according to the one or more characteristics of the first device.

7. The method of claim 1, further comprising:
    prior to receiving the third item, receiving, by the processing system, third data indicating that the third item is available from the second cloud via the first cloud;
    generating, by the processing system, an output including a notification message in response to receiving the third item; and
    presenting, by the processing system, the output via a display of the first device.

8. The method of claim 1, further comprising:
    transmitting, by the processing system, a search request for a fourth item from the first device to the first equipment operating from the first cloud; and receiving information related to the search request at the first device, wherein the information indicates that the fourth item is accessible to a plurality of devices from the second equipment operating from the second cloud via the first equipment operating from the first cloud, and wherein the plurality of devices are associated with a user account corresponding to the first cloud.

9. A non-transitory hardware computer-readable storage device storing instructions that, when executed by a processing system including a processor, cause the processor to perform operations, the operations comprising:
   modifying an auto copy mode of a user profile associated with first equipment operating from a first cloud via a graphical user interface provided by a cloud server;
   modifying a first data item stored in the first cloud, wherein the cloud server directs the first equipment operating from the first cloud to transmit, via peer-to-peer communication, the first data item stored in the first cloud to second equipment operating from a second cloud responsive to the modifying the first data item according to the auto copy mode, wherein the first cloud is supported by first service provider, and the second cloud is supported by a second service provider;
   modifying a notification mode of the user profile via the graphical user interface generated by the cloud server;
   receiving a viewing notification from the first equipment operating the first cloud, wherein the viewing notification is transmitted from the second equipment operating the second cloud via peer-to-peer communication;
   selecting a link to a second data item associated with the viewing notification;
   receiving a data stream associated with the second data item from the first equipment operating from the first cloud, responsive to the selecting the link to the second data item, wherein the second data item is provided to the first equipment operating from the first cloud by the second equipment operating from the second cloud via peer-to-peer communication;
   receiving third data from the first equipment operating from the first cloud, wherein the third data is associated with an accessibility restriction corresponding to a second item of at least one of the first cloud or the second cloud, wherein the accessibility restriction indicates that a first portion of the second item is accessible to a first device and a second portion of the second item is inaccessible to the first device, and wherein the second item corresponds to a database storing entries associated with items in equipment operating from a plurality of clouds, and wherein the first equipment operating from the first cloud and the second equipment operating from the second cloud are included in the equipment operating from the plurality of clouds; and
   receiving a third item from the at least one of the first cloud or the second cloud, wherein the third item comprises content formatted according to one or more characteristics of a first device.

10. The non-transitory hardware computer-readable device of claim 9, wherein the content is formatted by the first equipment operating from the first cloud or the second equipment operating from the second cloud, wherein the formatting is via at least one of utilizing a coder-decoder (CODEC) configured according to the one or more characteristics of the first device, utilizing a resolution according to the one or more characteristics of the first device, utilizing a file format according to the one or more characteristics of the first device, or utilizing a compression ratio according to the one or more characteristics of the first device.

11. The non-transitory hardware computer-readable device of claim 9, wherein the first cloud is associated with a first user.

12. The non-transitory hardware computer-readable device of claim 11, wherein the first equipment operating from the first cloud comprises computing and data resources and includes a plurality of items stored in the first cloud that are accessible to a plurality of devices of the first user via a first network.

13. A non-transitory hardware computer-readable storage device storing instructions that, when executed by a processing system including a processor, cause the processor to perform operations, the operations comprising:
   modifying an auto copy mode of a user profile associated with first equipment operating from a first cloud via a graphical user interface provided by a cloud server;
   modifying a first data item stored in the first cloud, wherein the cloud server directs the first equipment operating from the first cloud to transmit, via peer-to-peer communication, the first data item stored in the first cloud to second equipment operating from a second cloud that is coupled to the first equipment operating from the first cloud responsive to the modifying the first data item according to the auto copy mode, wherein the first cloud is supported by first service provider, and the second cloud is supported by a second service provider;
   modifying a notification mode of the user profile via the graphical user interface generated by the cloud server;
   receiving a viewing notification from the first equipment operating the first cloud, wherein the viewing notification is transmitted from the second equipment operating the second cloud via peer-to-peer communication;
   selecting a link to a second data item associated with the viewing notification;
   receiving a data stream associated with the second data item from the first equipment operating from the first cloud, responsive to the selecting the link to the second data item, wherein the second data item is provided to the first equipment operating from the first cloud by the second equipment operating from the second cloud via peer-to-peer communication.

14. The non-transitory hardware computer-readable storage device of claim 13, wherein the first equipment operating from the first cloud is coupled to the second equipment operating from the second cloud via a peer-to-peer connection, and wherein the second item is stored at the second cloud.

15. The non-transitory hardware computer-readable storage device of claim 14, wherein the peer-to-peer connection comprises a dedicated data communication session managed by the first equipment operating from the first cloud and the second equipment operating from the second cloud.

16. The non-transitory hardware computer-readable storage device of claim 15, wherein the second data is received from a cloud server via the first equipment operating from the first cloud, wherein the second data is sent to the cloud server via a data connection distinct from the peer-to-peer connection, and wherein the cloud server maintains access rights for a plurality of clouds including the first cloud and the second cloud.

17. The non-transitory hardware computer-readable storage device of claim 16, wherein the second data is sent to the cloud server via a data connection distinct from the peer-to-peer connection.

18. The non-transitory hardware computer-readable storage device of claim 17, wherein the cloud server maintains access rights for the plurality of clouds including the first cloud and the second cloud.

19. The non-transitory hardware computer-readable storage device of claim 13, wherein the operations further comprise:
- receiving, at the first equipment operating from the first cloud, a permission request from a first device for information regarding access permissions associated with the first data item; and
- transmitting the information to the first device, wherein the information indicates an accessibility of the first data item by each of a plurality of clouds, wherein each cloud of the plurality of clouds is associated with a different user.

20. The non-transitory hardware computer-readable storage device of claim 13, wherein the operations further comprise:
- receiving, at the first equipment operating from the first cloud, a permission request from a first device for information regarding access permissions associated with the first data item; and
- transmitting the information to the first device, wherein the information indicates an accessibility of the first item to each of a plurality of cloud groups, wherein each cloud group of the plurality of cloud groups corresponds to a different user defined category.

\* \* \* \* \*